(12) United States Patent
Sato et al.

(10) Patent No.: US 9,215,488 B2
(45) Date of Patent: Dec. 15, 2015

(54) CONTENT DISPLAY-PLAYBACK SYSTEM, CONTENT DISPLAY-PLAYBACK METHOD, RECORDING MEDIUM HAVING CONTENT DISPLAY-PLAYBACK PROGRAM RECORDED THEREON, AND OPERATION CONTROL APPARATUS

(75) Inventors: Hideki Sato, Kanagawa (JP); Kouichi Matsuda, Tokyo (JP); Shuichi Otsu, Kanagawa (JP); Tomoya Narita, Chiba (JP)

(73) Assignee: Sony Corporation, Tokyo (JP)

( * ) Notice: Subject to any disclaimer, the term of this patent is extended or adjusted under 35 U.S.C. 154(b) by 2048 days.

(21) Appl. No.: 11/433,414

(22) Filed: May 15, 2006

(65) Prior Publication Data

US 2006/0263048 A1 Nov. 23, 2006

(30) Foreign Application Priority Data

May 23, 2005 (JP) .................................. 2005-150235
Feb. 6, 2006 (JP) .................................. 2006-028987

(51) Int. Cl.
*H04N 21/41* (2011.01)
*H04N 21/414* (2011.01)
(Continued)

(52) U.S. Cl.
CPC .......... *H04N 21/4126* (2013.01); *G06F 1/1626* (2013.01); *H04N 5/775* (2013.01); *H04N 21/4122* (2013.01); *H04N 21/4135* (2013.01); *H04N 21/41407* (2013.01); *H04N 21/4222* (2013.01); *H04N 21/42204* (2013.01); *H04N 21/42207* (2013.01); *H04N 21/42208* (2013.01); *H04N 21/42227* (2013.01); *H04N 21/432* (2013.01); *H04N 21/433* (2013.01);
(Continued)

(58) Field of Classification Search
None
See application file for complete search history.

(56) References Cited

U.S. PATENT DOCUMENTS 7,581,035 B1 * 8/2009 Oliveira et al. ............... 709/251
2002/0044225 A1 * 4/2002 Rakib ........................... 348/734
(Continued)

FOREIGN PATENT DOCUMENTS

JP 07-336318 * 12/1995
JP Hei9(1997)-214873 * 8/1997
(Continued)

OTHER PUBLICATIONS

Office Action issued Aug. 17, 2010 in JP Application No. 2006-028987.

*Primary Examiner* — Ricky Chin
(74) *Attorney, Agent, or Firm* — Oblon, McClelland, Maier & Neustadt, L.L.P.

(57) ABSTRACT

In a content display-playback system, an operation control apparatus controls operations of a content providing apparatus and display-playback apparatus connected to a network so that content can be transmitted and received among the content providing apparatus, the display-playback apparatus, and the operation control apparatus and that the content can be displayed and played back on the display-playback apparatus and the operation control apparatus. The operation control apparatus includes a storage unit. When a user operates the operation control apparatus to stop playback during playback of content received from the content providing apparatus on the display-playback apparatus or the operation control apparatus, content meta-information concerning the played back content and playback position information of the content being played back when the playback is stopped are stored in the storage unit.

16 Claims, 21 Drawing Sheets

(51) Int. Cl.
*H04N 21/422* (2011.01)
*G06F 1/16* (2006.01)
*H04N 21/432* (2011.01)
*H04N 21/433* (2011.01)
*H04N 21/84* (2011.01)
*H04N 21/431* (2011.01)
*H04N 21/472* (2011.01)
*H04N 5/775* (2006.01)
*H04N 21/436* (2011.01)
*H04N 21/4363* (2011.01)
*H04N 5/765* (2006.01)
*H04N 5/781* (2006.01)

(52) U.S. Cl.
CPC ....... *H04N21/4325* (2013.01); *H04N 21/4334* (2013.01); *H04N 21/43615* (2013.01); *H04N 21/43637* (2013.01); *H04N 21/47217* (2013.01); *H04N 5/765* (2013.01); *H04N 5/781* (2013.01)

(56) References Cited

U.S. PATENT DOCUMENTS

| | | | |
|---|---|---|---|
| 2003/0093802 A1* | 5/2003 | Cho et al. | 725/90 |
| 2003/0185156 A1* | 10/2003 | Sato et al. | 370/235 |
| 2004/0154040 A1* | 8/2004 | Ellis | 725/58 |
| 2004/0223245 A1* | 11/2004 | Morohashi | 360/15 |
| 2004/0237115 A1* | 11/2004 | Horiuchi et al. | 725/116 |
| 2005/0094031 A1* | 5/2005 | Tecot et al. | 348/473 |
| 2005/0174489 A1 | 8/2005 | Yokoyama et al. | |
| 2005/0251835 A1* | 11/2005 | Scott et al. | 725/88 |
| 2009/0138922 A1* | 5/2009 | Thomas et al. | 725/87 |
| 2009/0172750 A1* | 7/2009 | Scheelke | 725/81 |
| 2012/0030719 A1* | 2/2012 | Lim et al. | 725/81 |

FOREIGN PATENT DOCUMENTS

| | | |
|---|---|---|
| JP | 2003-299064 | 10/2003 |
| JP | 2003-333359 | 11/2003 |
| JP | 2003-348125 | 12/2003 |
| JP | 2005-63519 | 3/2005 |
| KR | 1999-86454 | * 12/1999 |

* cited by examiner

CONTENT DISPLAY-PLAYBACK SYSTEM, CONTENT DISPLAY-PLAYBACK METHOD, RECORDING MEDIUM HAVING CONTENT DISPLAY-PLAYBACK PROGRAM RECORDED THEREON, AND OPERATION CONTROL APPARATUS

CROSS REFERENCES TO RELATED APPLICATIONS

The present invention contains subject matter related to Japanese Patent Application JP 2005-150235 filed in the Japanese Patent Office on May 23, 2005 and Japanese Patent Application JP 2006-028987 filed in the Japanese Patent Office on Feb. 6, 2006, the entire contents of which are incorporated herein by reference.

BACKGROUND OF THE INVENTION

1. Field of the Invention

The present invention relates to a content display-playback system and a content display-playback method in which a content providing apparatus and display-playback apparatus connected to a wired or wireless network are controlled in operation by an operation control apparatus so that video information can be transmitted among the content providing apparatus, the display-playback apparatus, and the operation control apparatus and that video can be displayed on the display-playback apparatus and the operation control apparatus. The present invention also relates to a recording medium having recorded thereon a content display-playback program implementing the content display-playback method. The present invention also relates to an operation control apparatus in the content display-playback system for controlling operations of the content providing apparatus and the display-playback apparatus via the network.

2. Description of the Related Art

With the prevalence of video recorders capable of recording television (TV) broadcast programs onto videotapes, a "time-shift" viewing style in which users view TV broadcast programs at any convenient time, rather than the broadcast time, has become common. In such a viewing style, the users record many TV broadcast programs and view them later. The recent evolution of recording media from videotapes to hard disks allows the users to easily store a larger amount of video data in hard disks (storage devices) without worrying about the capacity. Such hard-disk-based video recorders are hereinafter referred to as "digital video recorders (DVRs)", unless specifically stated otherwise.

In a recent content display-playback system, an audio-visual (AV) content server (content providing apparatus) and a display-playback apparatus including a display unit, such as a cathode ray tube (CRT), a liquid crystal display (LCD), or a plasma display, and an audio generation unit are connected to a wired or wireless network established in a home, office, local area, or global area environment. In this content display-playback system, for example, a user who connects at least one digital video recorder to the network as an AV content server can view a recorded TV broadcast program over the network on the display-playback apparatus even at a place distant from the AV content server.

Japanese Unexamined Patent Application Publication No. 2003-348125 discloses an information distribution system. In this information distribution system, if access to a network fails during the viewing of moving image data via streaming on the system described above, the current playback position is recorded when a network error occurs so that the distribution of the data can be requested starting from the playback position after recovery from the network error in order to prevent missing data (scenes) during the period in which the network is not accessible.

The information distribution system disclosed in this publication includes an information distribution apparatus and an information processing apparatus. The information distribution apparatus includes a distribution unit that distributes data to the information processing apparatus, and a stopping unit that stops the distribution of the data in response to an instruction for stopping the distribution of the data from the information processing apparatus. When the information processing apparatus issues an instruction for distributing the data, the distribution unit starts the distribution of the data from a predetermined position according to the instruction. The information processing apparatus includes a receiving unit that receives data distributed from the information distribution apparatus, a playback unit that plays back the data received by the receiving unit, a monitoring unit that monitors network traffic, a storage unit that stores the current playback position of the data played back by the playback unit when the monitoring unit detects a network error, and an instructing unit that instructs the information distribution apparatus to start the distribution of the data from the playback position stored in the storage unit when the monitoring unit detects recovery from the network error.

In an existing TV set, a user operates buttons or the like on a remote operation apparatus, an operation control apparatus, or a remote commander (hereinafter referred to as a "remote controller") for the TV set to display a menu for selection of an available operation on a display screen of the TV set. The user uses the remote controller for the TV set to select an item of interest, and operates the remote controller according to guidance displayed on the display screen to perform the desired operation, such as image quality control or timer setting.

In a receiver for receiving a satellite broadcast signal, such as a set-top box (STB) or an integrated receiver decoder (IRD), electronic program guide (EPG) data is displayed on the display screen of a monitor receiver. A user uses a remote controller attached to the receiver to select a desired program based on the EPG displayed on the display screen of the monitor receiver, whereby a desired one of channels available on the receiver can be selected.

As such, the TV set or the receiver for receiving a TV broadcast signal is configured to provide a user-friendly easy-to-use selection of an item of interest by combining a guide information view, such as a menu, guidance, or EPG, on the display screen with the operation of the remote controller.

In some cases, however, the above-mentioned operation in which information, such as a menu or guidance, is displayed on the display screen of a TV set or a receiver, such as an STB or IRD, and a user operates a remote controller while viewing the information to perform a desired operation on the TV set or the like is complicated.

For example, the user scrolls through a plurality of menu pages or frequently operates the remote controller to move a cursor over the display screen to display a menu page including an item of interest from the plurality of menu pages, and further sets the selected item using the remote controller.

With the employment of LCD panels and the like, the compactness and portability of monitor devices for TV sets and the like have increased, which are designed to be operable within the vicinity of the users. In such cases, remote controllers for the TV sets are no longer necessary. Moreover, the users may be dissatisfied with the existence of remote controllers for operating external input devices, such as receivers, for supplying video signals and audio signals to the TV sets.

The present inventors have proposed a two-way communication system capable of setting up a more easy-to-use home network in which an operation control apparatus equipped with a display can be used to view video information, such as a television program, and to listen to audio information and in which a content providing apparatus and a display-playback apparatus can be remotely operated by means of operation display information displayed on a display element of the operation control apparatus and an intuitive operation of a touch position detector, such as a joystick handle or a touch panel. This system enables remote operation of the content providing apparatus and the display-playback apparatus by means of the operation display information displayed on the display element of the operation control apparatus equipped with the display and the touch position detector, such as a joystick handle or a touch panel, and enables the desired video to be displayed on the display device by means of an easy operation.

The present inventors have further proposed a content display-playback system and a video display control apparatus, which are disclosed in Japanese Unexamined Patent Application Publication No. 2003-333359, in which a video signal is supplied from a base device to a plurality of display devices using the above-mentioned two-way communication system, wherein a user only strokes the surface of the display screen of a display device with his/her finger to transmit and receive video between video devices to provide sensible switching, unlike a typical button operation of a remote controller. Specifically, in response to a gesture input provided by the user who moves his/her finger upward on a surface of a touch panel provided on an LCD of a portable display device, a "throw" function of switching the display of video A from the portable display device to a larger display device on which video B has been displayed is carried out. In response to a gesture input provided by the user who moves his/her finger downward on the surface of the touch panel provided on the LCD of the portable display device, a "catch" function of switching the display of the video B from the larger display device to the portable display device on which the video A has been displayed is carried out. The throw/catch functions disclosed in Japanese Unexamined Patent Application Publication No. 2003-333359 allow intuitive switching between a plurality of display devices.

SUMMARY OF THE INVENTION

In a content display-playback system of the related art including a content providing apparatus (server) capable of distributing AV content via streaming, a display-playback apparatus that displays and plays back content distributed via streaming from the content providing apparatus, and an operation control apparatus that controls transmission and reception of data between the content providing apparatus and the display-playback apparatus over a network, once the display and playback of the content is interrupted by the user, the content is generally played back again from the beginning when playback resumes after the interruption. On account of this, there is an increasing desire for a system in which display and playback can resume from the interrupted position of the played back content after the interruption.

Further, a system in which a content providing apparatus and display-playback apparatus connected to a network are controlled in operation by an operation control apparatus is being developed. This system, however, may need processing for content meta-information or playback position (time) information to transmit and receive content among the content providing apparatus, the display-playback apparatus, and the operation control apparatus and to carry out the throw/catch functions described above during streaming playback of content distributed via streaming from the content providing apparatus on the display-playback apparatus and the operation control apparatus.

For example, it is difficult to display on the display control unit which content is being viewed when the display is switched from the operation control apparatus to the display-playback apparatus by a throw operation. It is also difficult to display which image is being displayed when the catch operation is carried out.

Further, it is difficult to display information for identifying the display-playback apparatus designated as the throw destination when the throw operation is performed.

It is therefore desirable to provide a content display-playback system, a content display-playback method, a recording medium having a program recorded thereon, and an operation control apparatus in which playback can be resumed from a stop position even if a user pauses playback during streaming playback of content distributed via streaming from a content providing apparatus on a display-playback apparatus or an operation control apparatus. It is further desirable to provide a content display-playback system, a content display-playback method, a recording medium having a program recorded thereon, and an operation control apparatus in which a thumbnail image is extracted from content at pause time and the thumbnail image is displayed on an operation panel of an operation control apparatus so that the user can see at a glance which part of the content is being played back when the playback is stopped.

It is further desirable to provide a content display-playback system in which a content providing apparatus and display-playback apparatus connected to a network are controlled in operation by an operation control apparatus, wherein content meta-information or playback position information can be obtained and stored to perform the throw/catch functions during streaming playback of content distributed via streaming from the content providing apparatus on the display-playback apparatus and the operation control apparatus.

According to an embodiment of the present invention, there is provided a content display-playback system including a content providing apparatus, a display-playback apparatus, and an operation control apparatus, which are connected to a network, the operation control apparatus controlling operations of the content providing apparatus and the display-playback apparatus so that content can be transmitted and received among the content providing apparatus, the display-playback apparatus, and the operation control apparatus and that the content can be displayed and played back on the display-playback apparatus and the operation control apparatus. The operation control apparatus includes a storage unit that, when a user operates the operation control apparatus to stop playback during playback of content received from the content providing apparatus on the display-playback apparatus or the operation control apparatus, stores content meta-information concerning the played back content and playback position information of the content being played back when the playback is stopped.

The content meta-information includes the title of the content, the location of the content, the total time of the content, the codec type of the content, the resolution of the content, and the thumbnail of the content. The title of the content may be associated with a plurality of sets of the location of the content, the total time of the content, the codec type of the content, the resolution of the content, and the thumbnail of the content because the same content may have a plurality of different codec types and resolutions.

In the content display-playback system according to the embodiment of the present invention, therefore, even if a user operates the operation control apparatus to stop playback during playback of content received from the content providing apparatus on the display-playback apparatus or the operation control apparatus, content meta-information and playback position information at the playback stop time of the content can be recorded on the storage unit. When playback resumes, the content meta-information and the playback position information are read from storage unit.

According to another embodiment of the present invention, there is provided a content display-playback method for allowing an operation control apparatus to control operations of a content providing apparatus and display-playback apparatus connected to a network so that content can be transmitted and received among the content providing apparatus, the display-playback apparatus, and the operation control apparatus and that the content can be displayed and played back on the display-playback apparatus and the operation control apparatus. The content display-playback method includes the step of, when a user operates the operation control apparatus to stop playback during playback of content received from the content providing apparatus on the display-playback apparatus or the operation control apparatus, storing in a storage unit content meta-information concerning the played back content and playback position information of the content being played back when the playback is stopped.

According to another embodiment of the present invention, there is provided a recording medium having a content display-playback program recorded thereon, the content display-playback program implementing a content display-playback method for allowing an operation control apparatus to control operations of a content providing apparatus and display-playback apparatus connected to a network so that content can be transmitted and received among the content providing apparatus, the display-playback apparatus, and the operation control apparatus and that the content can be displayed and played back on the display-playback apparatus and the operation control apparatus. The content display-playback program includes the step of, when a user operates the operation control apparatus to stop playback during playback of content received from the content providing apparatus on the display-playback apparatus or the operation control apparatus, storing in a storage unit content meta-information concerning the played back content and playback position information of the content being played back when the playback is stopped.

According to another embodiment of the present invention, there is provided an operation control apparatus that controls operations of a content providing apparatus and display-playback apparatus connected to a network so that content can be transmitted and received among the content providing apparatus, the display-playback apparatus, and the operation control apparatus and that the content can be displayed and played back on the display-playback apparatus and the operation control apparatus. The operation control apparatus includes a storage unit that, when a user operates the operation control apparatus to stop playback during playback of content received from the content providing apparatus on the display-playback apparatus or the operation control apparatus, stores content meta-information concerning the played back content and playback position information of the content being played back when the playback is stopped.

According to another embodiment of the present invention, there is provided a content display-playback system including a content providing apparatus connected to a network, at least one display-playback apparatus connected to the network, and an operation control apparatus that controls operations of the content providing apparatus and the display-playback apparatus so that content can be transmitted and received among the content providing apparatus, the display-playback apparatus, and the operation control apparatus and that the content can be displayed and played back on the display-playback apparatus and the operation control apparatus. When a user operates the operation control apparatus to perform a throw operation during playback of content received from the content providing apparatus, the operation control apparatus generates a playback request including content meta-information concerning the played back content and playback position information of the content being played back when the throw operation is performed, and transmits the playback request to a display-playback apparatus designated as a throw destination.

In the content display-playback system according to the embodiment of the present invention, therefore, even if a user operates the operation control apparatus to perform a throw operation during playback of content on the operation control apparatus, the operation control apparatus generates a playback request including content meta-information and playback position information of the content being played back when the throw operation is performed, and transmits the playback request to a display-playback apparatus. The display-playback apparatus, which is designated as a throw destination, can receive streaming content at a playback position based on the playback position information from a content providing apparatus that has distributed the content via streaming to the operation control apparatus, and can play back the streaming content.

According to another embodiment of the present invention, there is provided a content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and that the content can be displayed and played back on the display-playback apparatus and the operation control apparatus. The content display-playback method includes the steps of, when a user operates the operation control apparatus to perform a throw operation during playback of content received from the content providing apparatus, obtaining content meta-information concerning the played back content and playback position information of the content being played back when the throw operation is performed; attaching the content meta-information and the playback position information to a playback request; and transmitting the playback request to a display-playback apparatus designated as a throw destination.

According to another embodiment of the present invention, there is provided a recording medium having a content display-playback program recorded thereon, the content display-playback program implementing a content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and that the content can be displayed and played back on the display-playback apparatus and the operation control apparatus. The content display-playback program includes the steps of, when a user operates the operation control apparatus to perform a throw operation during playback of content received from the content providing apparatus, obtaining content meta-information concerning the played back content and playback position information of the content being played back when the throw operation is performed; attaching the content meta-information and the playback position information to a playback request; and transmitting the playback request to a display-playback apparatus designated as a throw destination.

According to another embodiment of the present invention, there is provided an operation control apparatus that controls operations of a content providing apparatus and at least one display-playback apparatus that are connected to a network so that content can be transmitted and received among the content providing apparatus, the display-playback apparatus, and the operation control apparatus and that the content can be displayed and played back on the display-playback apparatus and the operation control apparatus, wherein, when a user operates the operation control apparatus to perform a throw operation during playback of content received from the content providing apparatus, content meta-information concerning the played back content and playback position information of the content being played back when the throw operation is performed are attached to a playback request, and the playback request is transmitted to a display-playback apparatus designated as a throw destination.

In the content display-playback system, the content display-playback method, and the recording medium having the content display-playback program recorded thereon according to the embodiments of the present invention, even if a user pauses playback during streaming playback of content distributed via streaming from a content providing apparatus on a display-playback apparatus or an operation control apparatus, playback can be resumed from the stop position. Further, a thumbnail image is extracted from content at the pause time and is displayed on an operation panel of the operation control apparatus so that the user can see at a glance which part of the content is being played back when the playback is stopped.

In the operation control apparatus according to the embodiment of the present invention, even if a user pauses playback during streaming playback of content distributed via streaming from a content providing apparatus on a display-playback apparatus or the operation control apparatus, playback can be resumed from the stop position.

Further, in the content display-playback system, the content display-playback method, and the recording medium having the content display-playback program recorded thereon according to the embodiments of the present invention, in order to implement the throw function, content meta-information and playback position information are obtained and attached to a playback request before the playback request is transmitted to a display-playback apparatus designated as a throw destination. The display-playback apparatus designated as the throw destination can receive content distributed via streaming by the content provider from a playback position, and can play back the streaming content. Further, the thumbnail of the image at the playback start position can be displayed as the image being played back at the throw operation time on a display unit of the operation control apparatus.

In the operation control apparatus according to the embodiment of the present invention, in order to implement the throw function, content meta-information and playback position information are obtained and attached to a playback request before the playback request is transmitted to a display-playback apparatus designated as a throw destination. The display-playback apparatus designated as the throw destination can receive content distributed via streaming by the content provider from a playback position, and can play back the streaming content. Further, the thumbnail of the image at the playback start position can be displayed as the image being played back at the throw operation time on a display unit of the operation control apparatus.

DESCRIPTION OF THE PREFERRED EMBODIMENTS

An embodiment of the present invention will be described with reference to the drawings.

Figure 1:
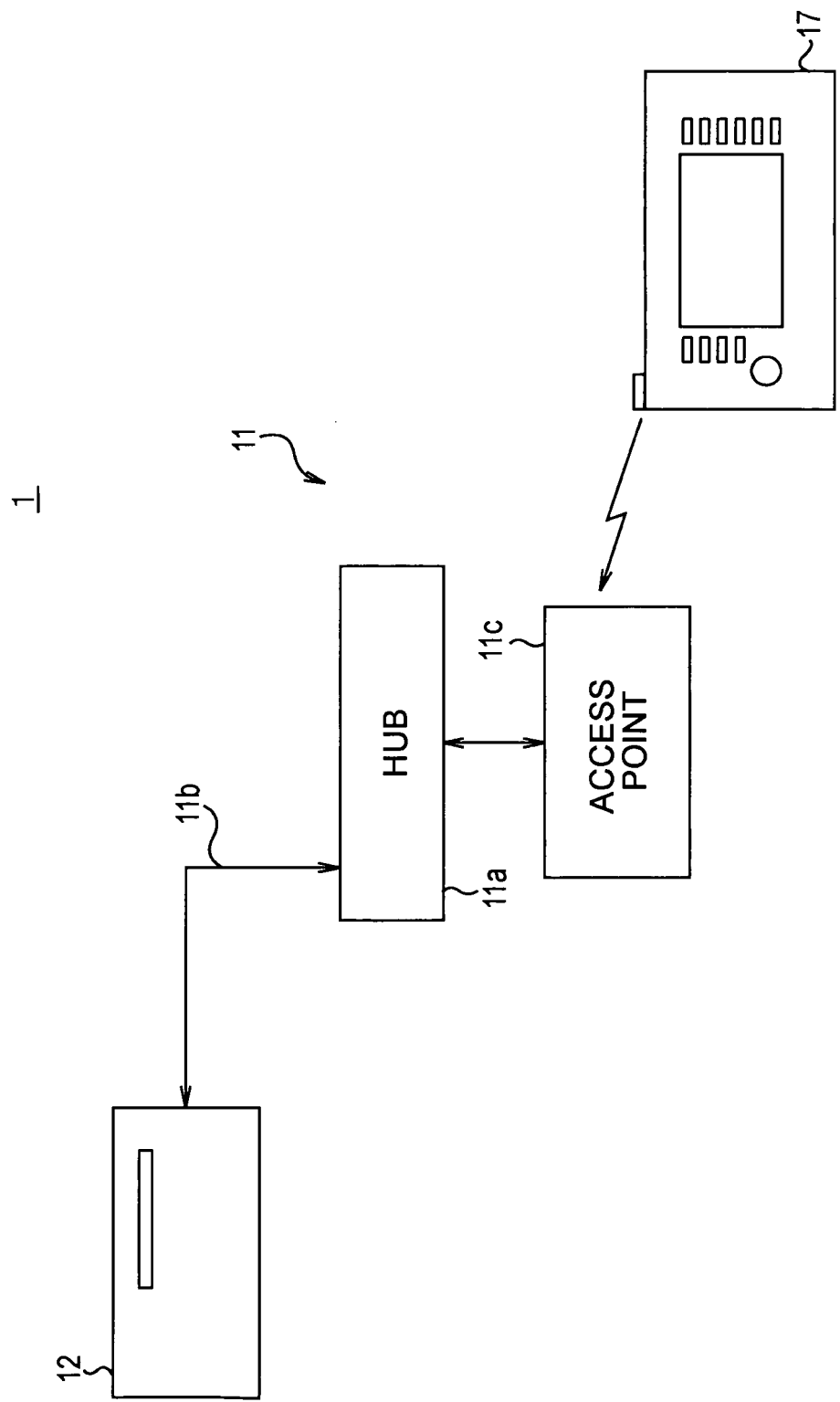
FIG. 1 is a block diagram of a content display-playback system.

FIG. 1 is a block diagram of a content display-playback system 1 according to an embodiment of the present invention. The content display-playback system 1 is configured such that a content providing apparatus 12, which is an AV content server such as a digital video recorder, is connected to a home network 11 having wired and wireless networks. An operation control apparatus 17 that controls the operation of the content providing apparatus 12 is also connected to the home network 11.

The home network 11 is an in-home digital network, and the content providing apparatus 12 is connected via a hub 11a using a network cable 11b, e.g., a Category 5 (CAT5) cable that meet TIA/EIA-568A specifications. A wireless LAN access point 11c is connected to the hub 11a, and the operation control apparatus 17 is wirelessly connected using a predetermined protocol, such as the IEEE 802.11 protocol or an extension to the IEEE 802.11 protocol. Therefore, the operation control apparatus 17 is connected to the content providing apparatus 12 on the home network 11, and controls the operation of the content providing apparatus 12.

Figure 2:
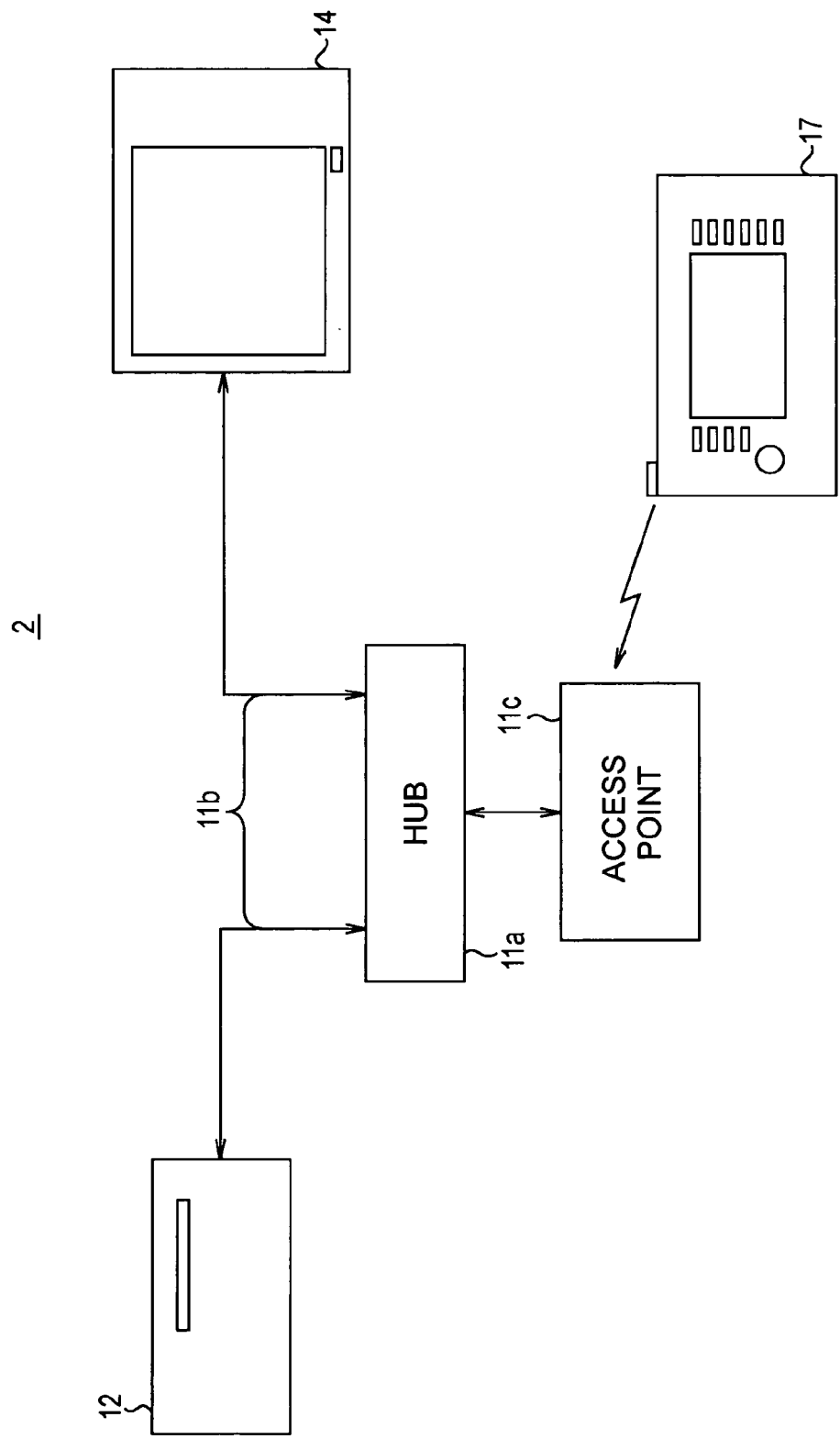
FIG. 2 is a block diagram of a content display-playback system.

FIG. 2 is a block diagram of a content display-playback system 2 in which a display-playback apparatus 14 is connected to the hub 11a. The operation control apparatus 17 is connected to the content providing apparatus 12 and the display-playback apparatus 14 on the home network 11, and controls the operations of the content providing apparatus 12 and the display-playback apparatus 14. The display-playback apparatus 14 displays video and plays back audio. The display-playback apparatus 14 has functions of displaying and playing back any kind of medium, and is also called a renderer.

Figure 3:
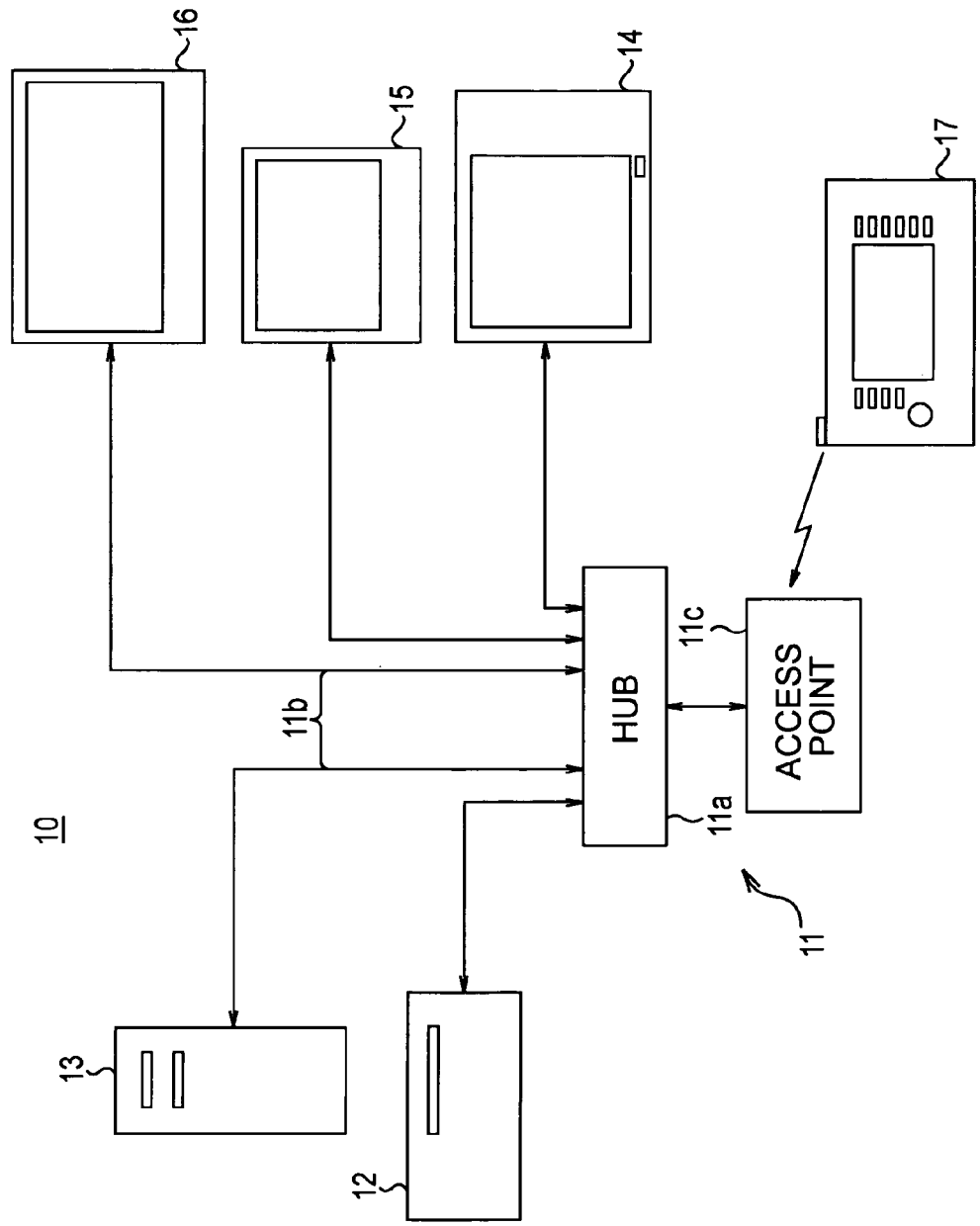
FIG. 3 is a block diagram of a content display-playback system.

FIG. 3 is a block diagram of a content display-playback system 10. In the content display-playback system 10, two content providing apparatuses, namely, content providing apparatuses 12 and 13, and three display-playback apparatuses, namely, display-playback apparatuses 14, 15, and 16, are connected to the hub 11a and the operations of these apparatuses are controlled by the operation control apparatus 17.

An embodiment of the present invention will be described in detail hereinafter in the context of the content display-playback system 2 shown in FIG. 2. It is to be understood that the arrangement described below is also applicable to the content display-playback system 1 shown in FIG. 1 and the content display-playback system 10 shown in FIG. 3. For example, the content display-playback system 1 includes at least one server (i.e., the content providing apparatus 12) that distributes audio-visual content via streaming, and at least one client (i.e., the operation control apparatus 17) that plays back the content distributed via streaming from the server in a streaming manner. In the system 1, the client (i.e., the operation control apparatus 17) requests the server (i.e., the content providing apparatus 12) to distribute content via streaming, and client operation settings for streaming playback can be performed.

In the content display-playback system 2 shown in FIG. 2, the operation control apparatus 17, the details of which are discussed below, is provided with a display device, such as an LCD, and is capable of receiving audio-visual (AV) content distributed via streaming and playing back the streaming content. The operation control apparatus 17 is further provided with a function (control point (CP)) of controlling other apparatuses. With the use of a wireless LAN section of the home network 11, the operation control apparatus 17 is able to access apparatuses on the home network 11 via the wireless LAN access point 11c. In FIG. 2, the content providing apparatus 12 is an AV server capable of distributing streaming content. The content providing apparatus 12 stores AV content. The display-playback apparatus 14 is controlled by the operation control apparatus 17, and has a function of playing back the content by streaming.

Therefore, the content display-playback system 2 is a content display-playback system including at least one server (i.e., the content providing apparatus 12) capable of distributing AV content via streaming, at least one operation control apparatus that receives the distributed content, e.g., the operation control apparatus 17, and at least one display-playback apparatus, e.g., the display-playback apparatus 14. In the content display-playback system 2, the operation control apparatus 17 includes a storage unit (not shown). Once the user operates the operation control apparatus 17 to stop playback during playback of the content received from the content providing apparatus 12 on the display-playback apparatus 14 or the operation control apparatus 17, content meta-information concerning the currently played back content and playback position information of the content being played back at the playback stop time are stored in the storage unit.

The content meta-information includes the title of the content, the location of the content, the total time of the content, the codec type of the content, the resolution of the content, and the thumbnail of the content. The title of the content may be associated with a plurality of sets of the location of the content, the total time of the content, the codec type of the content, the resolution of the content, and the thumbnail of the content because the same content may have a plurality of different codec types and resolutions.

In the content display-playback system 2, therefore, even if a user operates the operation control apparatus 17 to stop playback during playback of the content received from the content providing apparatus 12 on the display-playback apparatus 14 or the operation control apparatus 17, content meta-information and playback position information of the content being played back at the playback stop time are recorded on the storage unit. When playback resumes, the content meta-information and the playback position information are read from the storage unit. Since the operation control apparatus 17 is able to obtain the information based on the content meta-information, such as the title of the content, the location of the content, the total time of the content, the codec type of the content, and the resolution of the content, and the playback position at the playback stop time when playback resumes, playback can be resumed from the stop position. Specifically, the operation control apparatus 17 requests the content providing apparatus 12 to transmit content described in the content meta-information from the stop position, and the transmitted content is played back by streaming.

In addition to the content meta-information and the stop position, the operation control apparatus 17 may also store in the storage unit a thumbnail image created from the content image being played back at the playback stop time. In this case, when playback resumes, the operation control apparatus 17 can read the thumbnail at the stop time, in addition to the information based on the content meta-information, such as the title of the content, the location of the content, the total time of the content, the codec type of the content, and the resolution of the content, and the playback position at the playback stop time.

The content display-playback system 2 therefore allows the user to see at a glance at the playback time which part of the content was being played back at the playback stop time, and enables playback from the stop position. Specifically, the content providing apparatus 12 is requested to transmit the content described in the content meta-information from the stop position, and the transmitted content is played back by streaming.

Further, when the user operates the operation control apparatus 17 to stop playback during playback of the content received from the content providing apparatus 12 on the display-playback apparatus 14 or the operation control apparatus 17, the operation control apparatus 17 may store a thumbnail image created by the content providing apparatus 12 in the storage unit together with the content meta-information and the playback position information.

The operation control apparatus 17, when disconnected from the network 11, reproduces content stored in a content storage unit included in the operation control apparatus 17 from a playback stop position set by the user according to the content meta-information and playback position information at the playback stop time stored in the storage unit.

The content display-playback system 2 or 10 will be described in detail.

Figure 4:
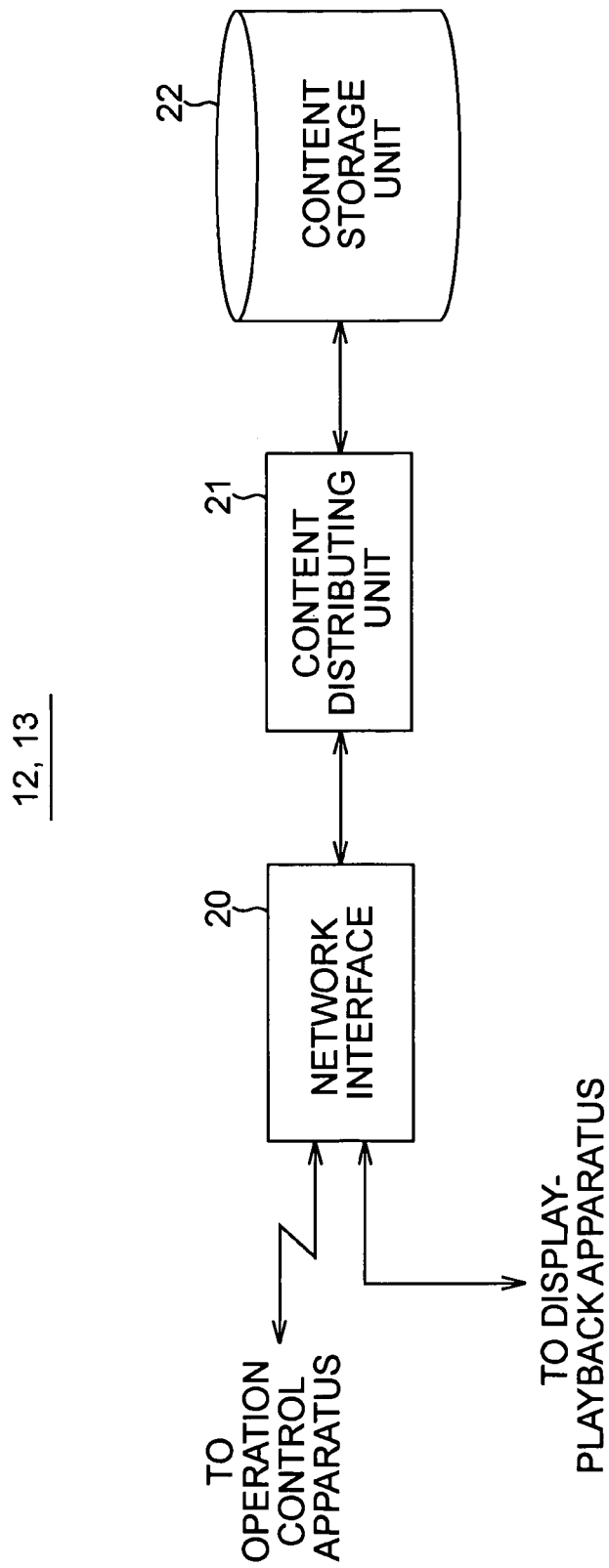
FIG. 4 is a functional block diagram of a content providing apparatus.

FIG. 4 is a functional block diagram of the content providing apparatus 12. The same applies to the content providing apparatus 13 of the content display-playback system 10 shown in FIG. 3. The content providing apparatus 12 is an AV content server, such as a digital video recorder. The content providing apparatus 12 includes a network interface unit 20, a content distributing unit 21, and a content storage unit 22.

In the content display-playback systems 2 and 10, the content providing apparatus 12 stores video and audio content (hereinafter referred to as "content") received at home via satellite digital broadcasting, terrestrial analog broadcasting, or the Internet in the content storage unit 22, which is a large-capacity storage medium such as a hard disk, as streaming data. In response to a distribution request transmitted from the operation control apparatus 17 via the network interface unit 20, the content distributing unit 21 reads and reproduces the streaming data stored in the content storage unit 22, and the content providing apparatus 12 distributes the streaming data to a desired display-playback apparatus or operation control apparatus via the network interface unit 20.

Figure 5:
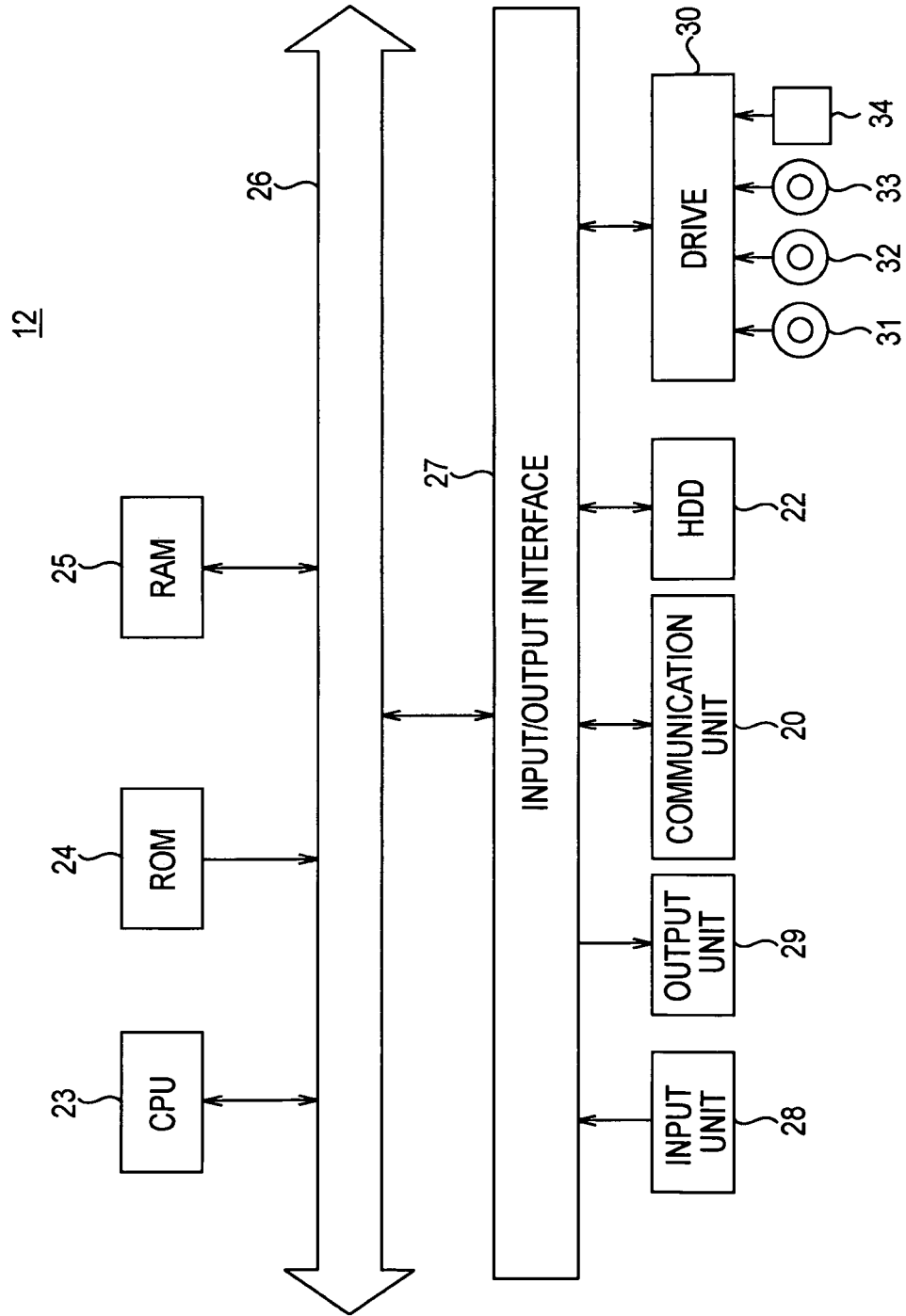
FIG. 5 is a hardware diagram of the content providing apparatus.

FIG. 5 is a diagram showing an example hardware configuration of the content providing apparatus 12. A central processing unit (CPU) 23 executes various processes according to server programs stored in a read only memory (ROM) 24 or server programs loaded from a hard disk drive 22 onto a random access memory (RAM) 25. The RAM 25 also stores data necessary for the CPU 23 to execute the various processes, if necessary.

The CPU 23, the ROM 24, and the RAM 25 are connected to one another via a bus 26. An input/output interface 27 is also connected to the bus 26.

The input/output interface 27 is connected to an input unit 28 composed of a button, a switch, a keyboard, a mouse, or the like, an output unit 29 including a display, such as a CRT or an LCD, and a speaker, a communication unit 20 composed of a modem, a terminal adapter, or the like, which functions as the network interface unit 20, and a hard disk drive 22, which functions as the content storage unit 22.

The communication unit 20 performs communication via the home network 11. In the content display-playback system 10, the communication units 20 of the content providing apparatuses 12 and 13 are connected to the wireless LAN access point 11c via the hub 11a using lines 11b. The communication units 20 are also connected to the display-playback apparatuses 14, 15, and 16 via the hub 11a using lines 11b. Thus, the content providing apparatuses 12 and 13 are connected to the operation control apparatus 17 via the communication units 20 through wireless communication paths in the home network 11, and are connected to the display-playback apparatuses 14, 15, and 16 through the wired communication paths 11b. Wireless communication is performed between the wireless LAN access point 11c and the operation control apparatus 17, discussed below, according to a predetermined protocol, such as the IEEE 802.11 protocol or an extension to the IEEE 802.11 protocol.

The hard disk drive 22 stores the server programs and media data to be distributed via streaming.

The input/output interface 27 is also connected to a drive 30, if any. A magnetic disc 31, an optical disc 32, a magneto-optical disc 33, a semiconductor memory 34, or the like is loaded in the drive 30, if any, and a computer program (such as a server program) read therefrom is installed in the hard disk drive 22, if necessary.

In relation to the functional block diagram of FIG. 4, the components shown in FIG. 5 function as follows. The communication unit 20 functions as the network interface unit 20, and the HDD 22 functions as the content storage unit 22. The CPU 23, the ROM 24, the RAM 25, and each of the media 31 to 34 connected to the drive 30 functions as the content distributing unit 21.

The operation of the content providing apparatus 12 will be described with reference to the hardware configuration. The content providing apparatus 12 is a computer, and the CPU 23 executes a streaming data distribution process according to a server program. For example, the content providing apparatus 12 stores various types of media data in the HDD 22. For example, in response to a request for distributing certain media data via streaming from the operation control apparatus 17 via the home network 11, the content providing apparatus 12 reads the corresponding content data, generates packets for streaming distribution of the content data, and delivers the packets via the home network 11.

Figure 6:
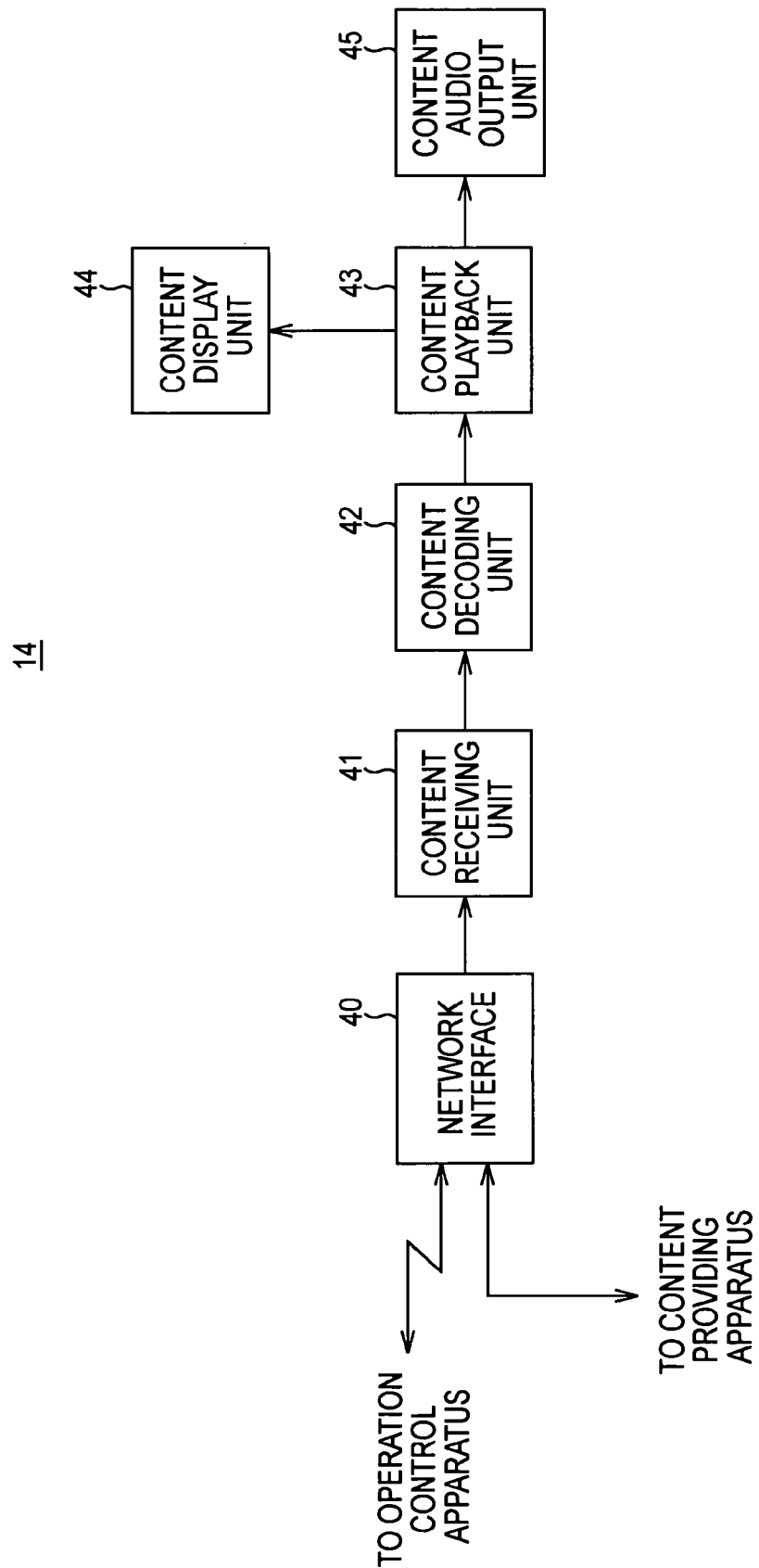
FIG. 6 is a functional block diagram of a display-playback apparatus.

FIG. 6 is a functional block diagram of each of the display-playback apparatuses 14, 15, and 16 of the content display-playback systems 2 and 10. The display-playback apparatus 14, by way of example, has a streaming playback function for receiving streaming data distributed via streaming from the content providing apparatus 12 or 13 and playing back and displaying the streaming data on an LCD or a CRT, and a function for playing back and outputting audio data associated with the video from a speaker. The display-playback apparatus 14 includes a network interface unit 40 having an interface function for connecting to the home network 11, a content receiving unit 41 that receives streaming data (content data) via the network interface unit 40, a content decoding unit 42 that decodes the content data, a content playback unit 43 that plays back the content data decoded by the content decoding unit 42, a content display unit 44 that displays the video of the played back content, and a content audio output unit 45 that outputs the audio of the played back content.

The display-playback apparatus 14 operates as a streaming playback function unit by using the function units illustrated in FIG. 6 in the following manner. The network interface unit 40 connects to the home network 11; the content receiving unit 41 receives streaming data (content data) via the network interface unit 40; the content decoding unit 42 decodes the content data; the content playback unit 43 plays back the content data decoded by the content decoding unit 42; the content display unit 44 displays the played back video of the content; and the content audio output unit 45 outputs audio associated with the video.

Figure 7:
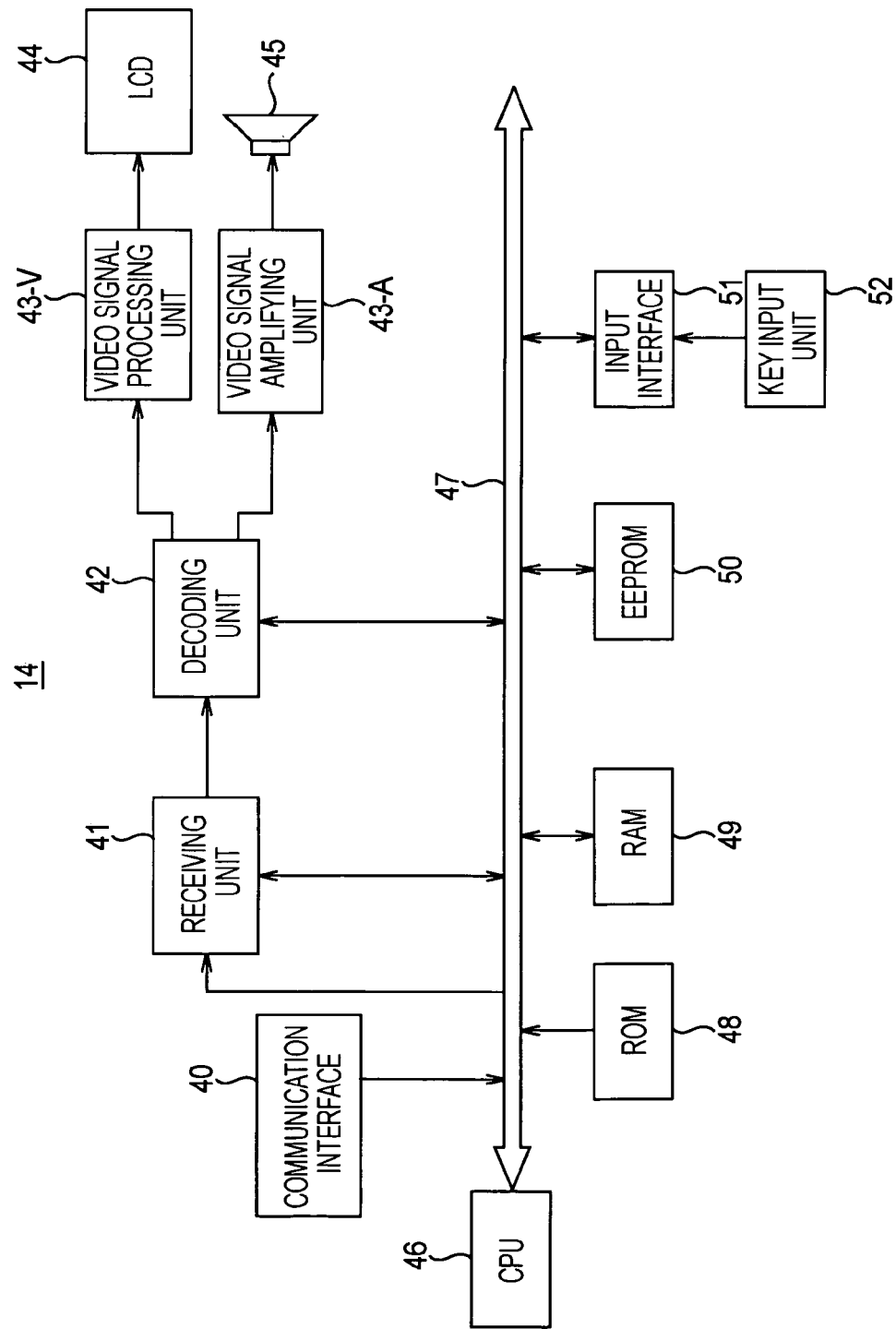
FIG. 7 is a hardware diagram of the display-playback apparatus.

FIG. 7 is a diagram showing an example hardware configuration of the display-playback apparatuses 14, 15, and 16. For example, the display-playback apparatus 14 includes a communication unit (communication interface) 40, a receiving unit 41, a decoding unit 42, a video signal processing unit 43-V, an LCD 44, an audio signal amplifying unit 43-A, and a speaker 45. The respective components of the display-playback apparatus 14 are controlled by a control unit mainly including a CPU 46. The control unit is a microcomputer in which the CPU 46, a ROM 48, a RAM 49, and an electrically erasable programmable read-only memory (EEPROM) 50 are connected via a CPU bus 47. The CPU 46 is connected to a key input unit 52 via an input interface 51, and receives an operation signal from the user, such as an audio volume control signal, an image quality control signal, or a power on/off control signal.

The ROM 48 stores various processing programs executed by the display-playback apparatus 14 and the like and data necessary for processes. The RAM 49 is used mainly as a work area for various processes, e.g., for temporarily storing data obtained in the various processes.

The EEPROM 50 is a non-volatile memory designed so that the stored information is not lost when the power is turned off, and is adapted to store and hold various setting parameters.

The communication unit (communication interface) 40 performs communication via the home network 11. In the content display-playback systems 2 and 10, the communication unit 40 of the display-playback apparatus 14 is connected to the wireless LAN access point 11c via the hub 11a using the line 11b. The display-playback apparatus 14 is also connected to the content providing apparatuses 12 and 13 via the hub 11a using the lines 11b. Thus, the display-playback apparatuses 14, 15, and 16 are connected to the operation control apparatus 17 via the communication units 40 through wireless communication paths in the home network 11, and are connected to the content providing apparatuses 12 and 13 through the wired communication paths 11b.

The receiving unit 41 performs processing, such as demodulation, on the supplied signal, and supplies the demodulated signal to the decoding unit (expanding unit) 42. The content providing apparatuses 12 and 13 compress display data, such as text data and video data, and audio data of a terrestrial broadcast program, or information signals, such as video and audio signals, of a satellite broadcast program, and transmit the compressed data.

The decoding unit 42 of the display-playback apparatus 14 separates the demodulated compressed data signal supplied from the receiving unit 41 into a video signal and an audio signal, and expands (decompresses) the separated signals to recover the original signals before compression.

The decoding unit 42 performs digital/analog (D/A) conversion on the recovered video and audio signals to produce an analog video signal and an analog audio signal. The decoding unit 42 supplies the analog video signal to the video signal processing unit 43-V, and supplies the analog audio signal to the audio signal amplifying unit 43-A.

The video signal processing unit 43-V produces a display signal from the video signal supplied from the decoding unit 42, and supplies it to the LCD 44. Thus, an image corresponding to the video signal transmitted from the content providing apparatus 12 or 13 is displayed on the display screen of the LCD 44.

The audio signal amplifying unit 43-A amplifies the supplied audio signal to a predetermined level, and supplies the amplified signal to the speaker 45. Thus, sound corresponding to the audio signal associated with the video signal transmitted from the content providing apparatus 12 or 13 is output from speaker 45.

Therefore, each of the display-playback apparatuses 14 to 16 receives video and audio signals of a television broadcast program transmitted from the content providing apparatus 12 or 13 via the home network 11, and plays back and outputs the received video and audio signals, thereby providing the video and audio to the user.

Figure 8:
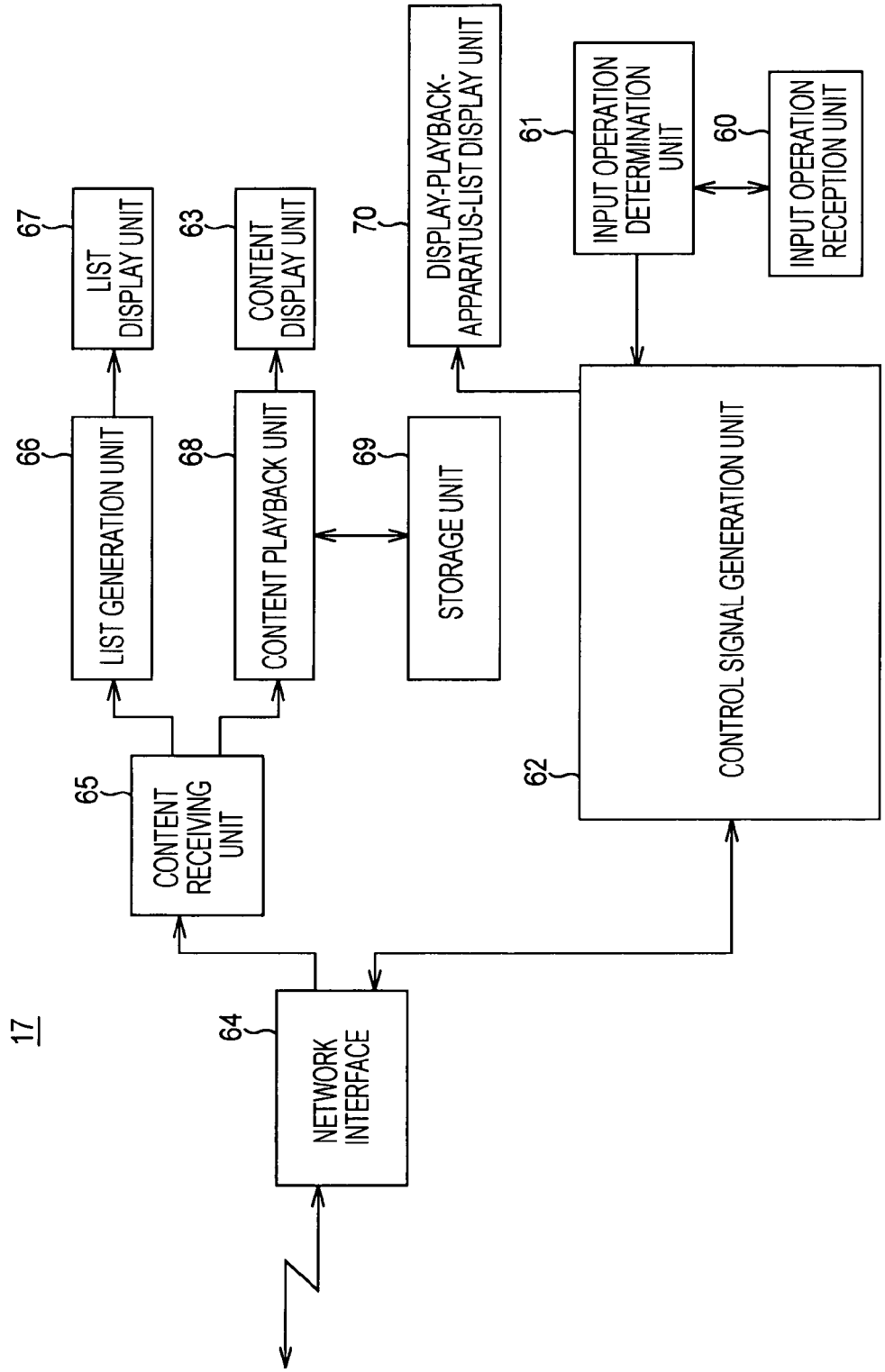
FIG. 8 is a functional block diagram of an operation control apparatus.

FIG. 8 is a functional block diagram of the operation control apparatus 17. For example, in the content display-playback system 10 shown in FIG. 3, the operation control apparatus 17 is a remote operating apparatus (remote controller) for controlling the operations of the content providing apparatuses 12 and 13 and display-playback apparatuses 14, 15, and 16 connected to the home network 11. The operation control apparatus 17 is provided with a display device, such as an LCD, and is capable of playing back AV content distributed via streaming from the content providing apparatuses 12 and 13. The operation control apparatus 17 therefore has a function of playing back AV content by streaming and a function of controlling the content providing apparatuses 12 and 13 and display-playback apparatuses 14, 15, and 16 connected to the home network 11.

Specifically, the operation control apparatus 17 controls transfer (transmission and reception or transmission) of video signal between apparatuses including the operation control apparatus 17, and controls the display of video and the playback of audio on the display-playback apparatuses 14 to 16 and the operation control apparatus 17. The operation control apparatus 17 includes an input operation reception unit 60 that receives an operation input from the user, a control signal generation unit (which handles a control signal for transmitting and receiving content and, in FIG. 8, is equivalent to a content transmission/reception signal generation unit) 62 having a video-information-transmission-and-reception-signal generation function of generating an operation signal for transmitting and receiving video signal between the apparatuses according to the input operation, and a display unit 63 that displays video information played back by streaming according to the operation signal generated by the control signal generation unit 62.

The operation control apparatus 17 further includes a network interface unit 64 for performing wireless communication with the wireless LAN access point 11c in the home network 11 according to a predetermined protocol, such as the IEEE 802.11 protocol or an extension to the IEEE 802.11 protocol. The operation control apparatus 17 further includes a content receiving unit 65 that receives and demodulates content-related information stored in the content providing apparatuses 12 and 13 and the content data itself.

The operation control apparatus 17 further includes a list generation unit 66 that generates a content list from the content-related information received and demodulated by the content receiving unit 65, and a list display unit 67 that displays the list generated by the list generation unit 66. The operation control apparatus 17 further includes a content playback unit 68 that decodes and plays back the content data received and demodulated by the content receiving unit 65, and a storage unit 69 that stores the content data played back by the content playback unit 68. When the user operates the operation control apparatus 17 to stop playback, the storage unit 69 stores content meta-information and playback position information of the content being played back at the playback stop time. The content data played back by the content playback unit 68 is displayed as video by the display unit 63.

The operation control apparatus 17 further includes an input operation determination unit 61 between the input operation reception unit 60 and the control signal generation unit 62 for determining the user's input operation received by the input operation reception unit 60.

The operation control apparatus 17 further includes a display-playback-apparatus-list display unit 70 for allowing the user to select a display-playback apparatus based on a selection signal generated by the control signal generation unit 62.

The control signal generation unit 62 generates various control signals according to the determination performed by the input operation determination unit 61 on the key input performed by the user by pressing, rotating, or moving up or down the handle or the like of the input operation reception unit 60.

The control signal generation unit 62 generates playback operation signals for playing back content on the display unit 63 of the operation control apparatus 17 and stopping and pausing the playback, and operation signals for starting, stopping, and pausing the playback of content on any of the display-playback apparatuses 14, 15, and 16 selected to display the content.

When the user operates the input operation reception unit 60 of the operation control apparatus 17 to stop playback during playback of the content received from the content providing apparatus on the display-playback apparatus or the operation control apparatus, the control signal generation unit 62 generates a playback stop signal. In response to the playback stop signal, the content playback unit 68 stops playing back the content.

Figure 9:
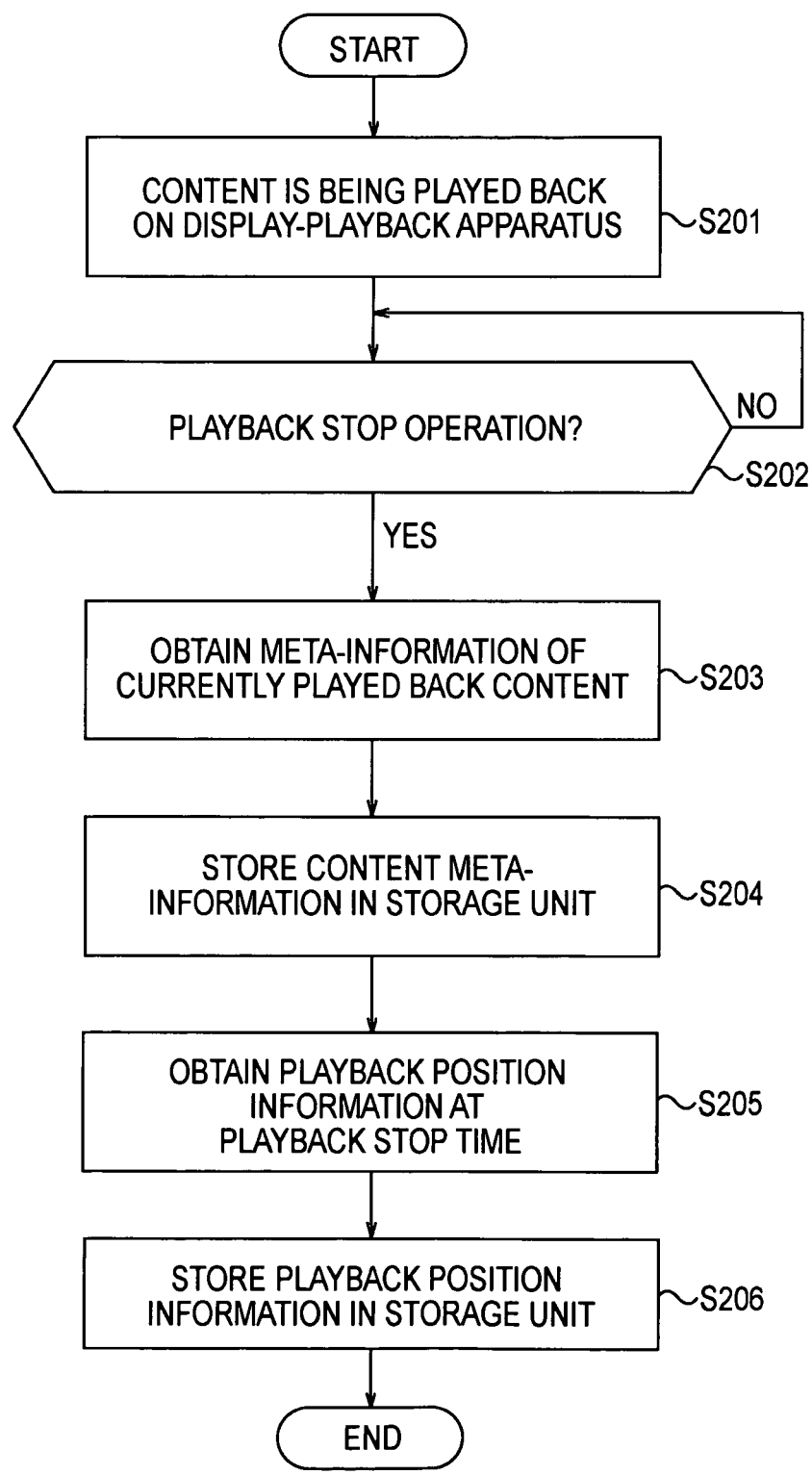
FIG. 9 is a flowchart showing a processing procedure when playback is stopped.

In response to a playback stop operation by the user using the operation control apparatus 17, the operation control apparatus 17 is able to record content meta-information and playback position information of the content being played back at the playback stop time on the storage unit 69 according to a processing procedure shown in FIG. 9.

In FIG. 9, the content display-playback system 2 or 10 determines that content is being currently played back on the display-playback apparatus 14 (step S201). When the user stops playback (YES in step S202), the operation control apparatus 17 obtains meta-information of the content currently played back on the display-playback apparatus 14 from the display-playback apparatus 14 (step S203). The content meta-information is stored in the storage unit 69 (step S204).

Then, the operation control apparatus 17 obtains playback position information of the content being played back when the user stops playback from the display-playback apparatus 14 (step S205). The playback position information is stored in the storage unit 69 (step S206).

As discussed above, the content meta-information includes the title of the content, the location of the content, the total time of the content, the codec type of the content, the resolution of the content, and the thumbnail of the content.

Figure 10:
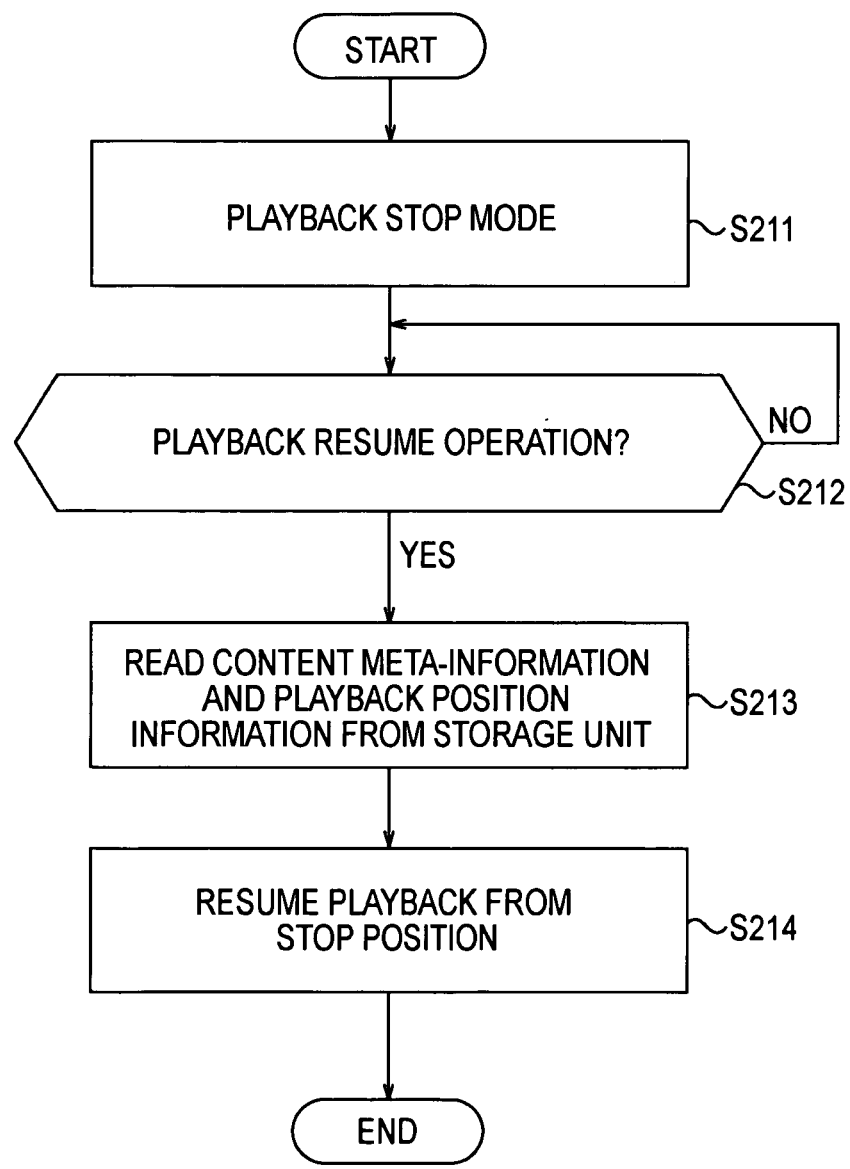
FIG. 10 is a flowchart showing a processing procedure when playback is resumed.

FIG. 10 shows a processing procedure of the operation control apparatus 17 when the user resumes playback. In step S211, playback is being stopped. In step S212, if the user operates the input operation reception unit 60 to resume playback (YES in step S212), the operation control apparatus 17 reads the content meta-information and the playback position information from the storage unit 69.

In this manner, when playback resumes, the operation control apparatus 17 retrieves the information based on the content meta-information, such as the title of the content, the location of the content, the total time of the content, the codec type of the content, and the resolution of the content, and also retrieves the playback position at the playback stop time. Thus, the operation control apparatus 17 enables playback from the stop position (step S214). Specifically, the content providing apparatus 12 that has distributed streaming content to the display-playback apparatus 14 before the playback is stopped is requested to transmit the content described in the content meta-information from the stop position, and the transmitted content is played back by streaming.

The operation control apparatus 17 may further store a thumbnail image created from a content image being played back at the playback stop time, in addition to the content meta-information and the stop position, in the storage unit 69. In this case, when playback resumes, the operation control apparatus 17 can retrieve the thumbnail at the stop time, in addition to the information based on the content meta-information, such as the title of the content, the location of the content, the total time of the content, the codec type of the content, and the resolution of the content, and the playback position at the playback stop time.

The content display-playback system 2 or 10 therefore allows the user to see at a glance at the playback time which part of the content was being played back at the playback stop time, and enables playback quickly from the stop position. Specifically, the content providing apparatus 12 is requested to transmit the content described in the content meta-information from the stop position, and the transmitted content is played back by streaming.

Specific examples of other control signals generated by the control signal generation unit 62 include a throw operation signal, a catch operation signal, and a copy operation signal. The throw operation signal is a signal for allowing content data that is distributed via streaming from a desired content providing apparatus to the operation control apparatus 17 and that is displayed on the content display unit 63 to be played back on a desired display-playback apparatus by streaming. The catch operation signal is a signal for allowing content data displayed on a display-playback apparatus to be displayed on the display unit 63 of the operation control apparatus 17. The copy operation signal is a signal for copying content data to the storage unit 69 during the catch operation.

The control signal generation unit 62 further generates a content provider selection signal for selecting the desired content providing apparatus 12 or 13 according to a user's input operation. The control signal generation unit 62 further generates a content selection signal for selecting desired content. The content selection signal is generated according to an operation by the user viewing a content list. The content list is created by the list generation unit 66 from the content-related information received by the content receiving unit 65, and is displayed by the list display unit 67. The control signal generation unit 62 further generates a display-playback-apparatus selection signal for selecting one of the display-playback apparatuses 14, 15, and 16. The display-playback-apparatus selection signal is generated according to an operation by the user viewing a display-playback-apparatus-list displayed on the display-playback-apparatus-list display unit 70.

The control signal generation unit 62 not only generates playback operation signals for playing back content on the display unit 63 of the operation control apparatus 17 and stopping and pausing the playback, but also generates operation signals for starting, stopping, and pausing playback of content on any of the display-playback apparatuses 14, 15, and 16 selected to display the content.

Figure 11:
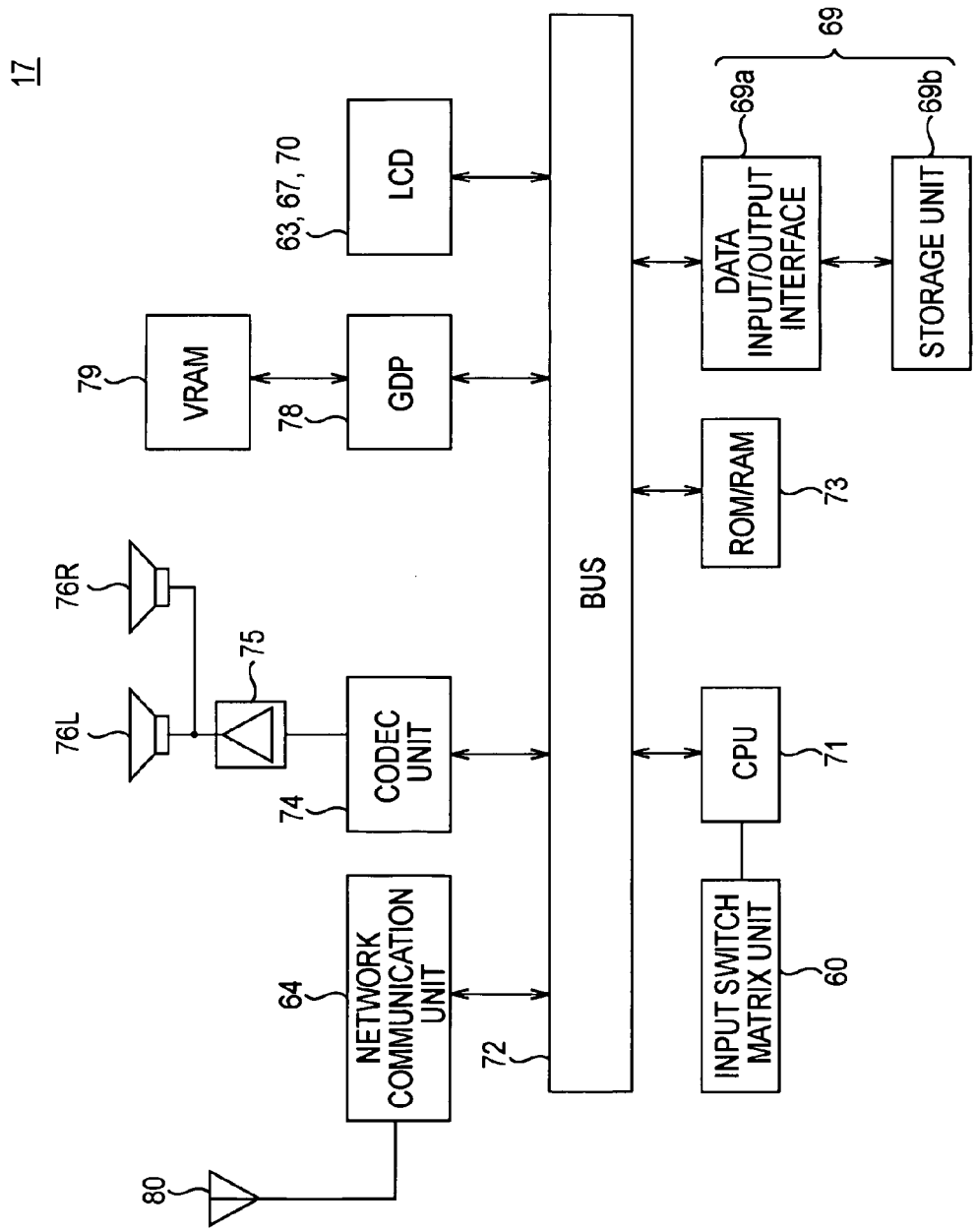
FIG. 11 is a hardware diagram of the operation control apparatus.

FIG. 11 illustrates an example hardware configuration of the operation control apparatus 17. The operation control apparatus 17 is configured such that a CPU 71 is connected to a network communication unit 64, a codec unit 74, a graphics display processor (GDP) 78, and an LCD 63 via a bus 72. The CPU 71 is further connected to a ROM/RAM 73 and a storage device 69. An input switch matrix unit 60, which is equivalent to the input operation unit 60, is connected to the CPU 71.

The network communication unit 64 performs wireless communication with the wireless LAN access point 11*c* via an antenna 80 according to a predetermined protocol, such as the IEEE 802.11 protocol or an extension to the IEEE 802.11 protocol, as discussed above.

The wireless communication performed by the network communication unit 64 enables the operation control apparatus 17 to transmit the control signals generated by the CPU 71, which functions as the control signal generation unit 62, according to a user's input operation via the input operation unit (input switch matrix unit) 60 to the content providing apparatuses 12 and 13 or the display-playback apparatuses 14, 15, and 16 connected to the home network 11 via the access point 11c. Further, the operation control apparatus 17 receives response signals from the respective apparatuses.

The ROM 73 stores a content display-playback program of the embodiment of the present invention, various process programs executed by the operation control apparatus 17, and data necessary for the processes. The RAM 73 is used mainly as a work area for various processes, e.g., for temporarily storing data obtained in the various processes.

The operation control apparatus 17 may further include an EEPROM, which is a non-volatile memory. The EEPROM is designed so that the stored information is not lost if the power is turned off, and is adapted to store and hold various setting parameters, etc.

The storage device 69 includes a data input/output interface 69a and a storage unit 69b, and is a memory device in which, for example, content meta-information or playback position (time) information obtained from the content providing apparatus 12 or 13 is stored when a catch function is carried out. The storage device 69 may be a semiconductor memory or an HDD.

Content data fed from a content providing apparatus or content meta-information and playback position information fed from a display-playback apparatus are received via the antenna 80 and the network communication unit 64. The codec unit 74 decodes audio data distributed via streaming through the network communication unit 64 and separated under the control of the CPU 71. The decoded audio data is amplified by an amplifier 75, and is then fed to 2-channel stereo speakers 76L and 76R to output sound from the speakers 76L and 76R. Video data distributed via streaming through the network communication unit 64 is separated under the control of the CPU 71, and is then subjected to video signal processing using the VRAM 79 by the GDP 78. The resulting video is displayed on the LCD 63.

Figure 12:
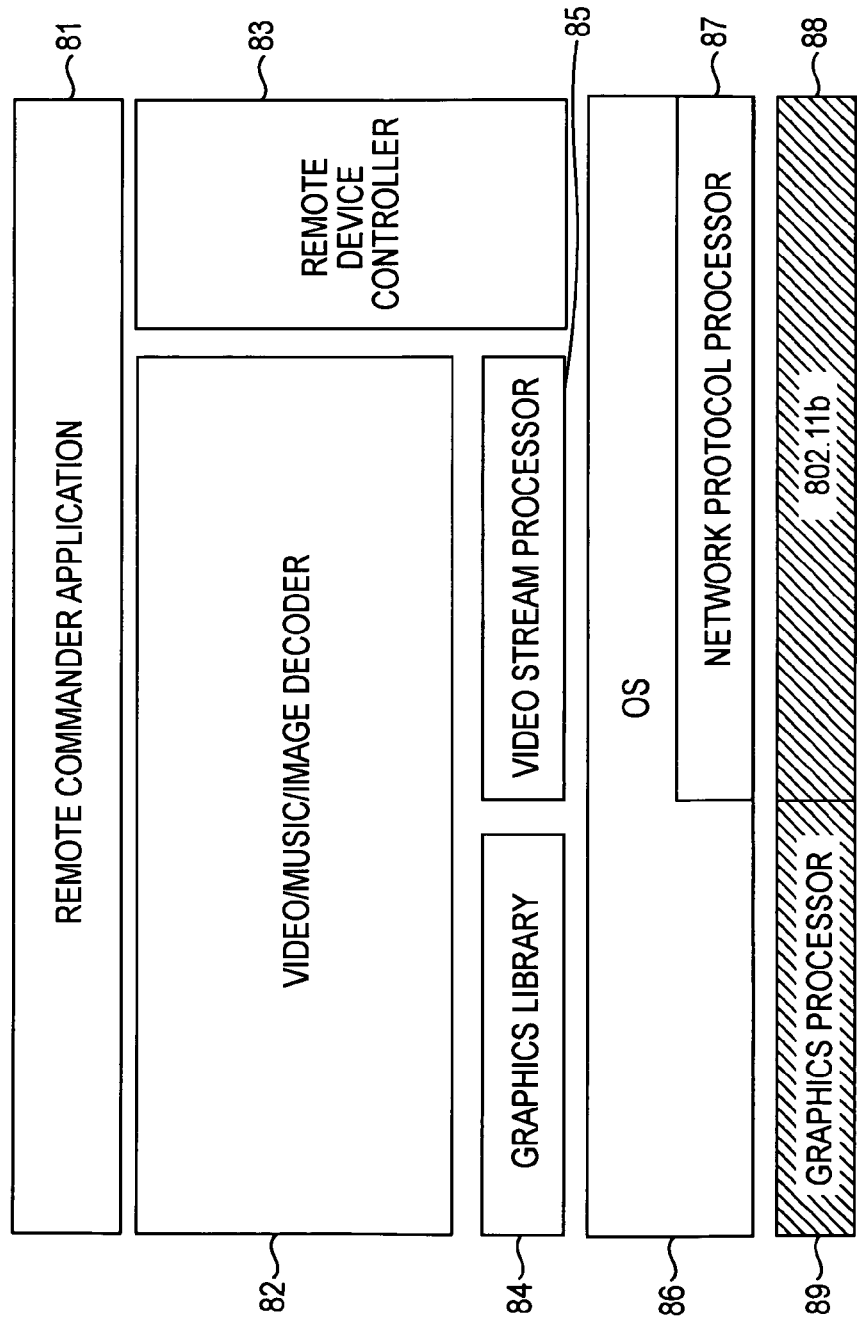
FIG. 12 is a software diagram of the operation control apparatus.

FIG. 12 is a block diagram of software executed by the CPU 71 of the operation control apparatus 17 having the above-described hardware configuration. A remote command application 81 generates a remote operation signal and controls the content providing apparatuses 12 and 13 and the display-playback apparatuses 14, 15, and 16. A video/music/image decoder 82, a remote device controller 83, a graphics library 84, and a video stream processor 85 are executed based on an operating system (OS) 86. A network protocol processor 87 executes an 802.11b wireless protocol 88, as discussed above. A graphics processor 89 is executed by the GDP 78.

Figure 13:
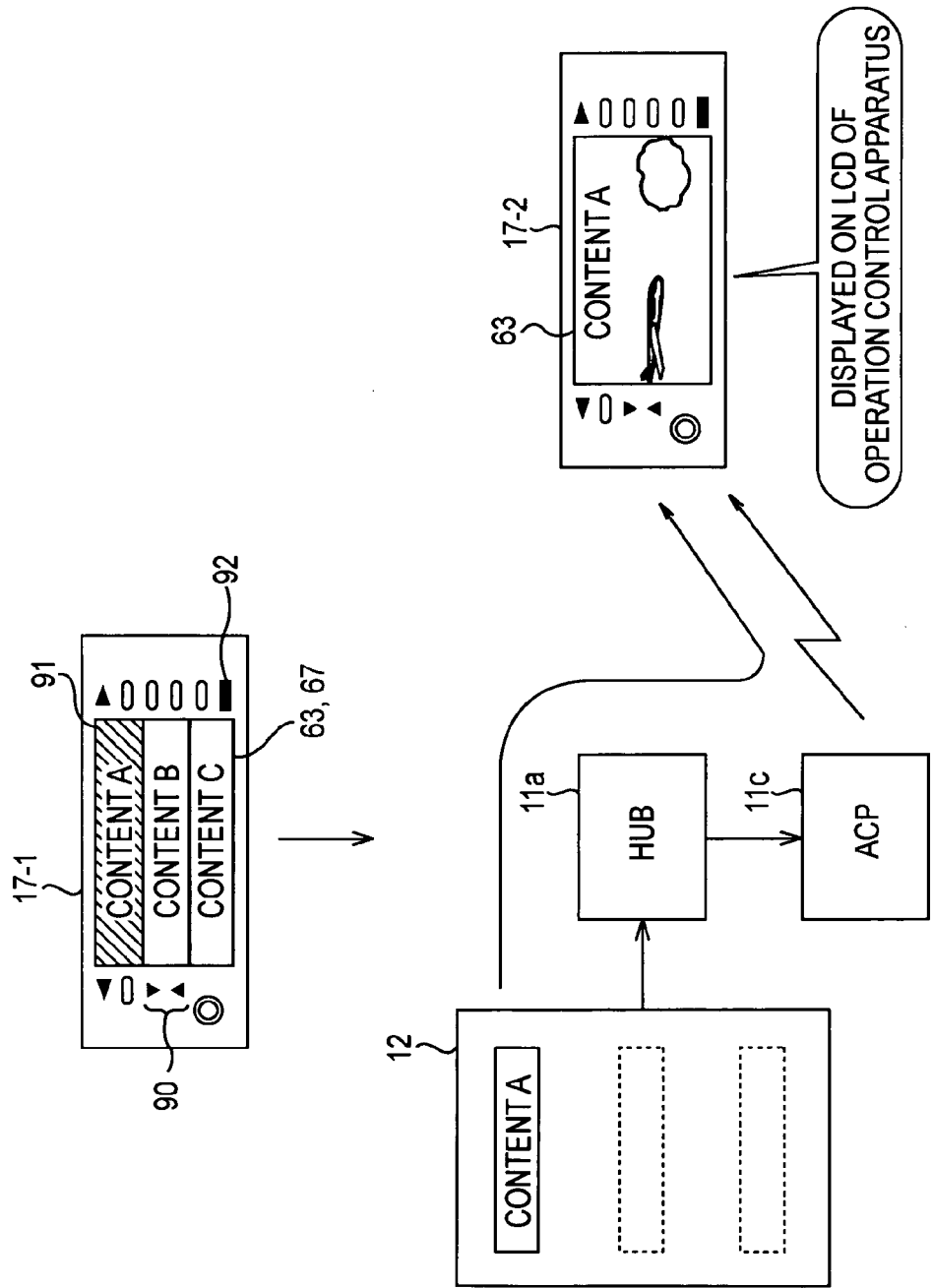
FIG. 13 is a diagram showing a display-playback process in the operation control apparatus.
Figure 14:
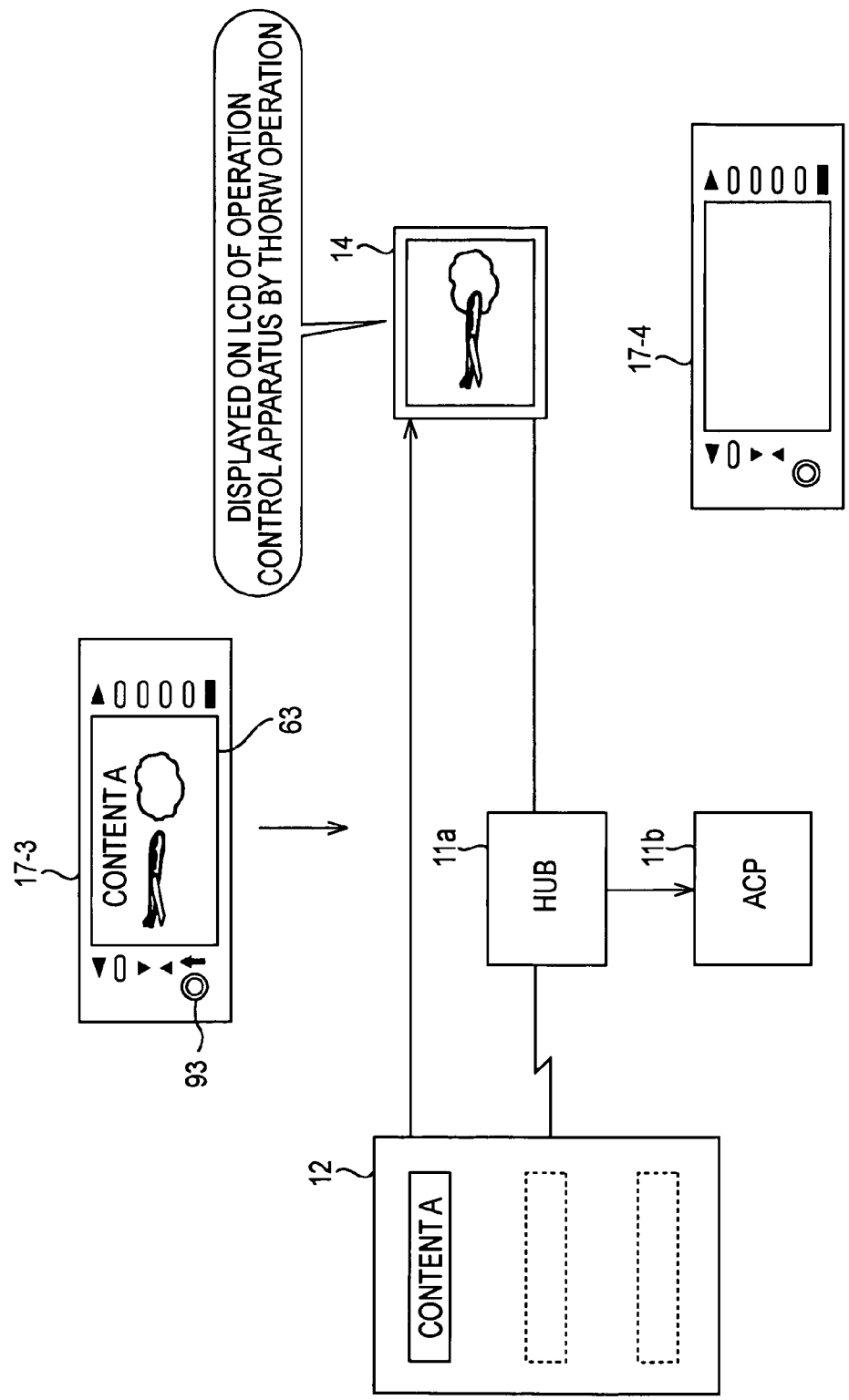
FIG. 14 is a diagram showing a throw operation by the operation control apparatus.
Figure 15:
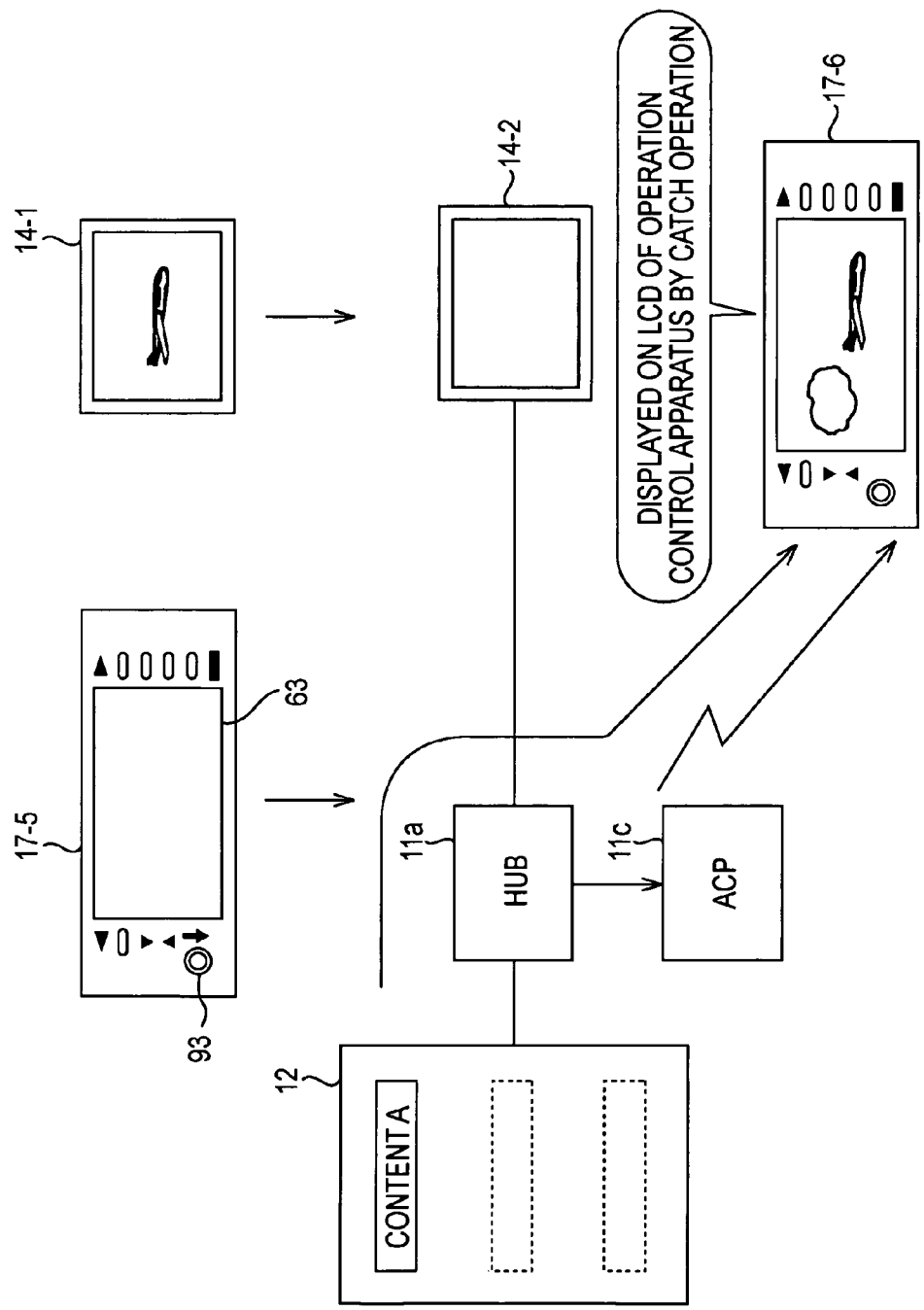
FIG. 15 is a diagram showing a catch operation by the operation control apparatus.

FIGS. 13, 14, and 15 are views provided by the content display-playback system 2 or 10, illustrating a view displayed on the operation control apparatus 17, on a view displayed on the display-playback apparatus 14 by the throw operation, and a view displayed on the operation control apparatus 17 by the catch operation, respectively.

First, referring to FIG. 13, a list of content items, e.g., content A, content B, and content C, is displayed on the content display unit (LCD) 63 on a display panel provided on the operation control apparatus 17 according to content information stored in the content providing apparatus 12 (17-1). The user uses a cursor movement button 90 of the input operation reception unit 60 to place a cursor 91 on the name of a desired content item to display a shaded content item on the list, and presses a set button 92 to display the selected content item, i.e., the content A, on the LCD 63 of the operation control apparatus 17 (17-2). If history information indicating that the content A has been played back to the middle exists, the content A can be played back from the middle.

Then, referring to FIG. 14, a control case where the selected content A is played back on the display-playback apparatus 14 will be described. The operation control apparatus 17 is provided with a joystick handle 93 on an operation panel of the operation control apparatus 17, and an operation of the joystick handle 93 is assigned to switching of content items. When the content A selected on the operation control apparatus 17 is displayed on the display-playback apparatus 14 by switching the display, the joystick handle 93 is moved up (as indicated by a black up-arrow) to perform a throw operation (17-3). The throw operation enables the content A to be played back on the display-playback apparatus 14 by streaming. The content A displayed on the LCD 63 of the operation control apparatus 17 disappears. However, the content A may still be displayed on the LCD 63. While the throw operation is performed in a state where the content A is displayed on the LCD 63 of the operation control apparatus 17, throw-based playback may be performed immediately after the icon of the content A is selected on the operation control apparatus 17.

Then, referring to FIG. 15, a control case where the selected content A is played back again on the operation control apparatus 17. In the operation control apparatus 17, as discussed above, an operation of the joystick handle 93 is assigned to switching of content items. When the content A selected on the operation control apparatus 17 is displayed on the operation control apparatus 17 by switching the display from the display-playback apparatus 14, the joystick handle 93 is moved down (as indicated by a black down-arrow) to perform a catch operation (17-5). The catch operation enables the content A to be played back on the operation control apparatus 17 in a streaming manner by changing the display of the content A from the display-playback apparatus 14 to the operation control apparatus 17 (17-6). The content A displayed on the LCD 44 of the display-playback apparatus 14 disappears (14-2). However, the content A may still be displayed on the LCD 44 of the display-playback apparatus 14.

The operation of the content display-playback system of the present embodiment in which content meta-information including at least playback position information of the content being played back at the playback stop time is stored in a storage unit when the user stops playback using the operation control apparatus 17 and in which playback resumes from the stop position will be described with reference to FIGS. 17 and 18 in conjunction with a comparative example shown in FIG. 16.

Figure 16:
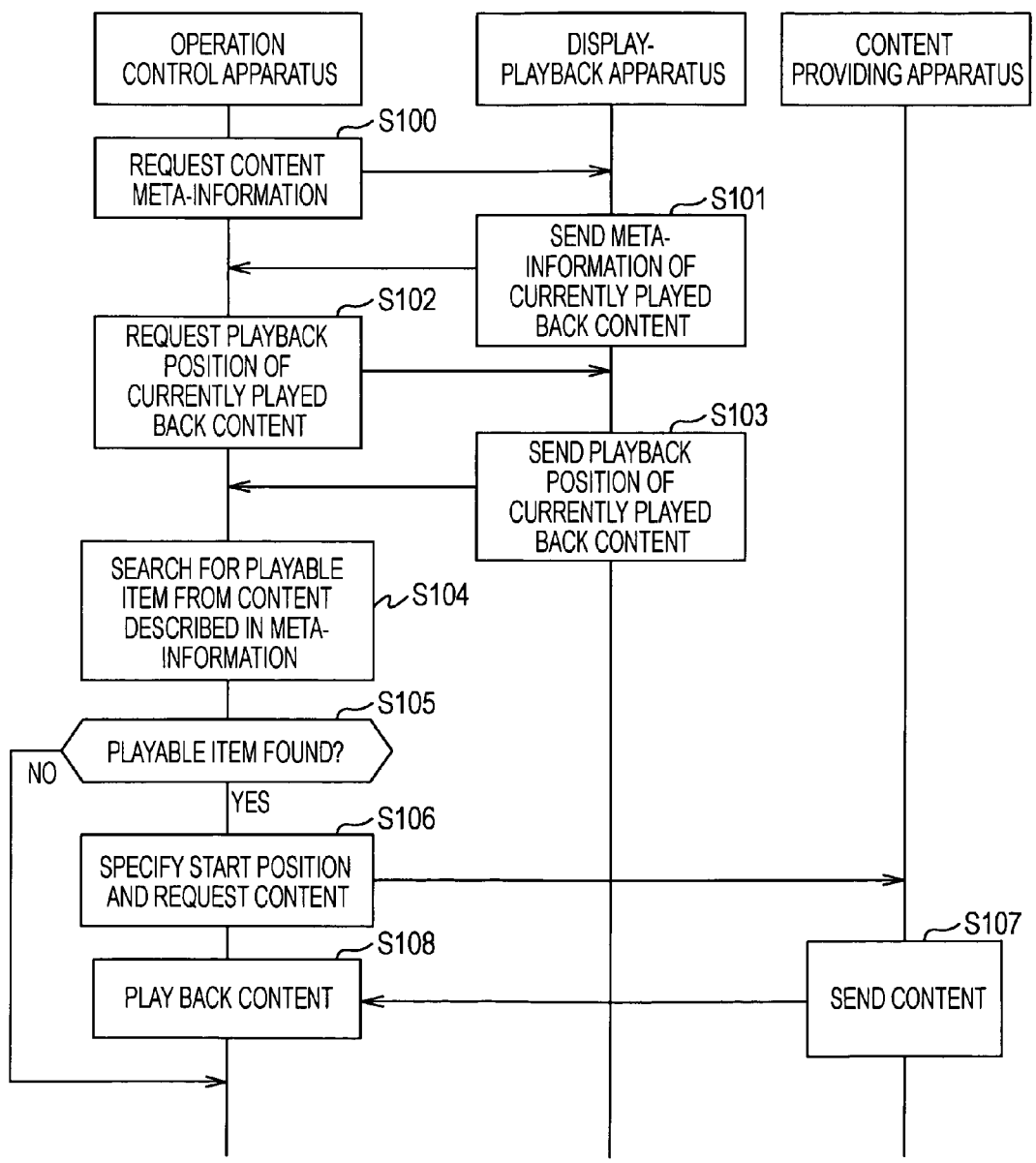
FIG. 16 is a state-transition diagram showing a typical catch operation.

FIG. 16 is a state-transition diagram showing a typical catch operation. A catch operation is an operation of switching display and playback from the display-playback apparatus 14 to the operation control apparatus 17 when the joystick handle 93 of the operation control apparatus 17 is moved down during playback of content on the display-playback apparatus 14. In step S100, the operation control apparatus 17 issues a request for meta-information of the content to the display-playback apparatus 14. In step S101, the display-playback apparatus 14 sends the meta-information of the currently played back content to the operation control apparatus 17. In step S102, the operation control apparatus 17 issues a request for a playback position of the content currently played back on the display-playback apparatus 14 to the display-playback apparatus 14. In step S103, the display-playback apparatus 14 sends the playback position of the currently played back content to the operation control apparatus 17.

In step S104, the operation control apparatus 17 searches for a content item playable on the operation control apparatus 17 from the content described in the meta-information. If it is determined in step S105 that any playable content item is found, then, in step S106, the operation control apparatus 17 specifies a start position and issues a request for the content to the content providing apparatus 12. In response to the request, in step S107, the content providing apparatus 12 sends the content. In step S108, the operation control apparatus 17 plays back the content. If it is determined in step S105 that there is no content item playable on the operation control apparatus 17, the catch operation is interrupted.

Figure 17:
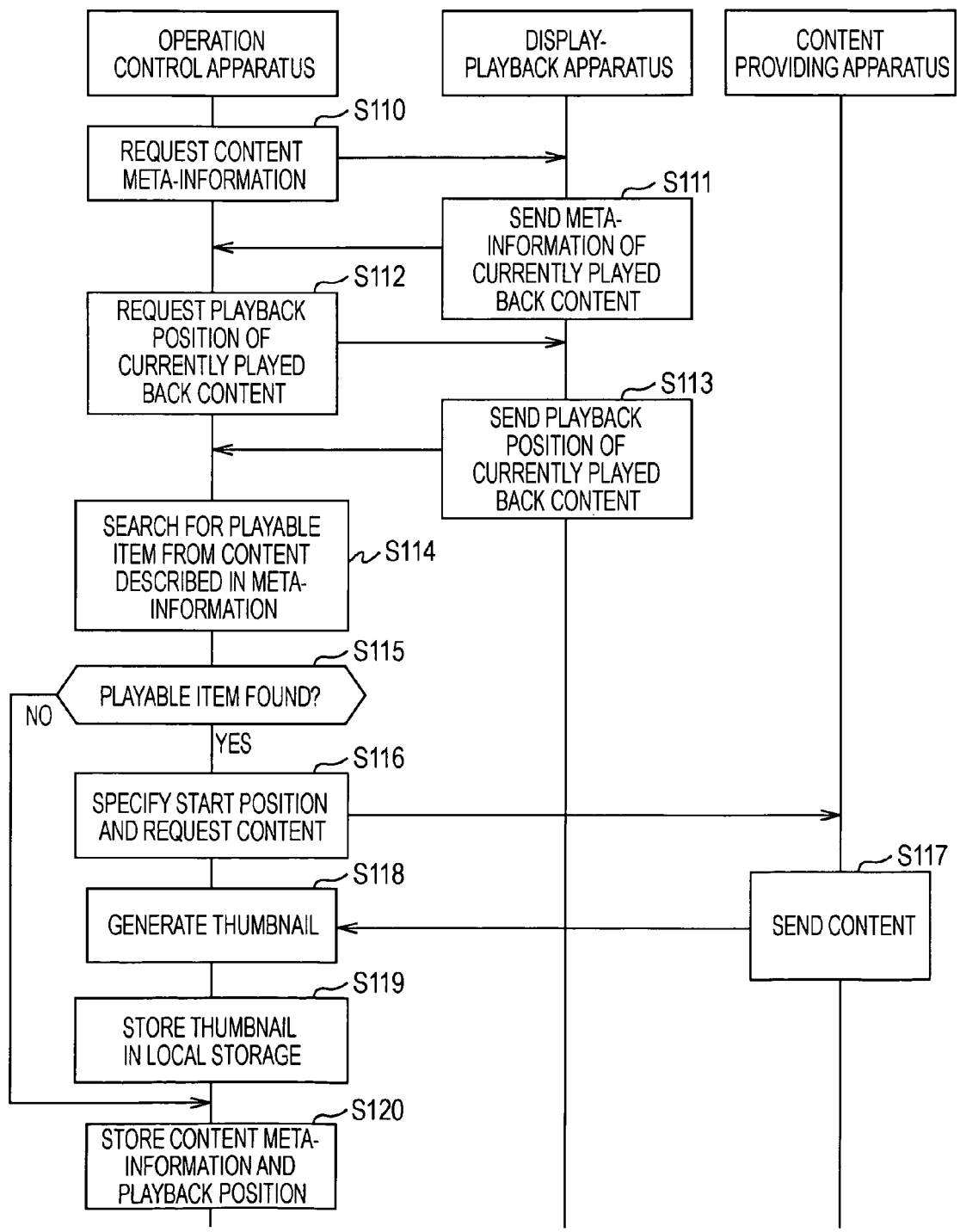
FIG. 17 is a state-transition diagram showing a first example process in the content display-playback system when a catch operation is performed.

FIG. 17 is a state-transition diagram showing an operation in which, by a catch operation, the operation control apparatus 17 creates a thumbnail from the content image being played back at playback stop time, stores the thumbnail and meta-information, such as playback position information, in the storage unit 69, and resumes playback by using the meta-information for recording the playback position.

For example, when the user operates the operation control apparatus 17 to stop streaming playback on the display-playback apparatus 14, a catch operation is performed, and, in step S110, the operation control apparatus 17 issues a request for meta-information of content to the display-playback apparatus 14. The meta-information includes the title of the content, the location of the content, the total time of the content, the codec type of the content, the resolution of the content, and the thumbnail of the content. The title of the content may be associated with a plurality of sets of the location of the content, the total time of the content, the codec type of the content, the resolution of the content, and the thumbnail of the content because the same content may have a plurality of different codec types and resolutions.

In step S111, the meta-information is sent from the display-playback apparatus 14. In step S112, the operation control apparatus 17 issues a request for a playback position of the currently played back content to the display-playback apparatus 14. In step S113, the display-playback apparatus 14 sends the playback position of the currently played back content.

In step S114, the operation control apparatus 17 searches for a content item playable on the operation control apparatus 17 from the content described in the meta-information. If it is determined in step S115 that any playable content item is found, then, in step S116, the operation control apparatus 17 specifies a playback start position and issues a request for the content to the content providing apparatus 12. In step S117, the content providing apparatus 12 sends the content to the operation control apparatus 17. In step S118, the operation control apparatus 17 generates a thumbnail. In step S119, the operation control apparatus 17 stores the generated thumbnail in a local storage (storage unit) in. In step S120, the operation control apparatus 17 stores the content meta-information and the playback position. Therefore, the operation control apparatus 17 stores the meta-information obtained in step Silo, the playback start position, and the thumbnail at the playback start position.

The thumbnail at the playback start position is displayed on the display panel of the operation control apparatus 17 to allow the user to visually confirm the image being played back when the playback was interrupted. When the playback stop is released by the operation control apparatus 17, the operation control apparatus 17 sends the content meta-information and playback position stored in the storage unit to the content providing apparatus 12, and receives streaming content transmitted from the image being played back at the playback stop time to play back the streaming content. When playback resumes, a throw operation may be performed to play back the streaming content on the display-playback apparatus 14. The client (i.e., the display-playback apparatus 14 or the operation control apparatus 17) that is to resume streaming playback may be selected manually or may be selected automatically by setting the client that is playing back the content at the playback stop time or automatically according to the history information.

By performing the processing procedure shown in FIG. 17, therefore, the operation control apparatus 17 resumes playback from the stop position even if the user pauses playing back the display-playback apparatus 14 during streaming playback of content distributed via streaming from the content providing apparatus 12.

Figure 18:
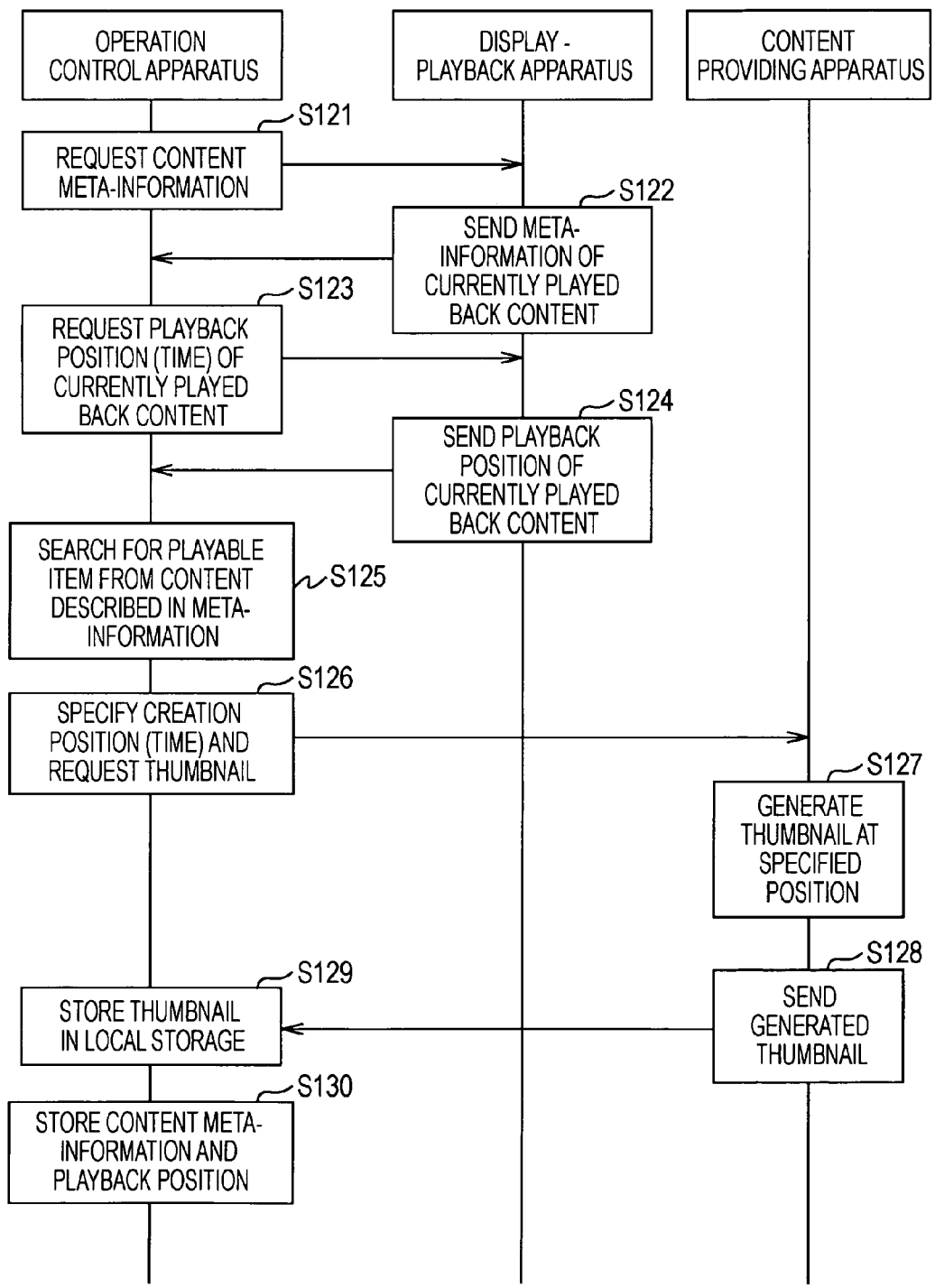
FIG. 18 is a state-transition diagram showing a second example process in the content display-playback system when a catch operation is performed.

FIG. 18 is a state-transition diagram showing an operation in which the content providing apparatus 12 creates a thumbnail from the content image being played back at playback stop time and sends the thumbnail to the operation control apparatus 17, and in which the operation control apparatus 17 stores the thumbnail and meta-information, such as playback position information, in the storage unit 69 and resumes playback by using the meta-information for recording the playback position.

For example, when the user operates the operation control apparatus 17 to stop streaming playback on the display-playback apparatus 14, a catch operation is performed, and, in step S121, the operation control apparatus 17 issues a request for meta-information of content to the display-playback apparatus 14. The meta-information includes the title of the content, the location of the content, the total time of the content, the codec type of the content, the resolution of the content, and the thumbnail of the content, as discussed above. The title of the content may be associated with a plurality of sets of the location of the content, the total time of the content, the codec type of the content, the resolution of the content, and the thumbnail of the content.

In step S122, the meta-information is sent from the display-playback apparatus 14. In step S123, the operation control apparatus 17 issues a request for a playback position of the currently played back content to the display-playback apparatus 14. In step S124, the display-playback apparatus 14 sends the playback position of the currently played back content.

In step S125, the operation control apparatus 17 searches for a content item playable on the operation control apparatus 17 from the content described in the meta-information. In step S126, the operation control apparatus 17 specifies a creation position (time) and issues a request for a thumbnail to the content providing apparatus 12.

In step S127, the content providing apparatus 12 creates a thumbnail of the image at the specified position. In step S128, the content providing apparatus 12 sends the created thumbnail to the operation control apparatus 17.

In step S129, the operation control apparatus 17 stores the thumbnail sent from the content providing apparatus 12 in a local storage (storage unit). In step S130, the operation control apparatus 17 stores the content meta-information and the playback position. Therefore, the operation control apparatus 17 stores the meta-information obtained in step S121, the playback start position, and the thumbnail of the image at the playback start position.

The thumbnail of the image at the playback start position is displayed on the display panel of the operation control apparatus 17 to allow the user to visually confirm the image being played back when the playback was interrupted. When the playback stop is released by the operation control apparatus 17, the operation control apparatus 17 sends the content meta-information and playback position stored in the storage unit to the content providing apparatus 12, and receives streaming content transmitted from the image being played back at the playback stop time to play back the streaming content. When playback resumes, a throw operation may be performed to play back the streaming content on the display-playback apparatus 14. The client (i.e., the display-playback apparatus 14 or the operation control apparatus 17) that is to resume streaming playback may be selected manually or may be selected automatically by setting the client that is playing back the content at the playback stop time or automatically according to the history information.

By performing the processing procedure shown in FIG. 18, therefore, the operation control apparatus 17 resumes playback from the stop position even if the user pauses playing back the display-playback apparatus 14 during streaming playback of content distributed via streaming from the content providing apparatus 12.

The operation of the content display-playback system 2 or 10 of the present embodiment in which meta-information of content and playback position (time) information of the content are obtained and stored in the storage device 69 and a thumbnail is further stored in a local storage when a throw operation is performed using the operation control apparatus 17 will be described with reference to FIGS. 11 and 19 to 21.

First, referring to the hardware configuration shown in FIG. 11, a process for switching playback of content to the display-playback apparatus (digital media renderer (DMR)) 14 by a throw operation by the user during a period in which the operation control apparatus 17 receives and plays back streaming moving picture content from, for example, the content providing apparatus 12 will be described. In particular, a first example process in which the operation control apparatus 17 creates a captured thumbnail at throw operation time will be illustrated.

The CPU 71 monitors the input switch matrix unit 60 and detects a throw operation. Then, the CPU 71 stops display refresh by the GDP 78, and stores captured thumbnails of the recordings of a VRAM 79 in the storage unit 69b of the storage device 69.

The CPU 71 disables the codec unit 74. Then, the CPU 71 transmits information necessary for playback, such as the content meta-information, the playback start position (time) information, and the information for designating the content providing apparatus 12, discussed above, to the display-playback apparatus 14.

Then, the operation control apparatus 17 displays a switching-in-progress view on the LCD 63, and waits for a change in a playback start status sent from the display-playback apparatus 14. Upon receiving a playback start status from the display-playback apparatus 14, the operation control apparatus 17 displays the captured thumbnail, which is stored in the storage device 69 together with the content meta-information, such as the name of the content continuously played back on the display-playback apparatus 14, on the LCD 63 as an external-playback-mode view. In the external-playback-mode view, an operation panel suitable for controlling the content currently played back on the display-playback apparatus 14 may be displayed, or, alternatively, the friendly name or custom name of the display-playback apparatus 14 or the like may be displayed.

Figure 19:
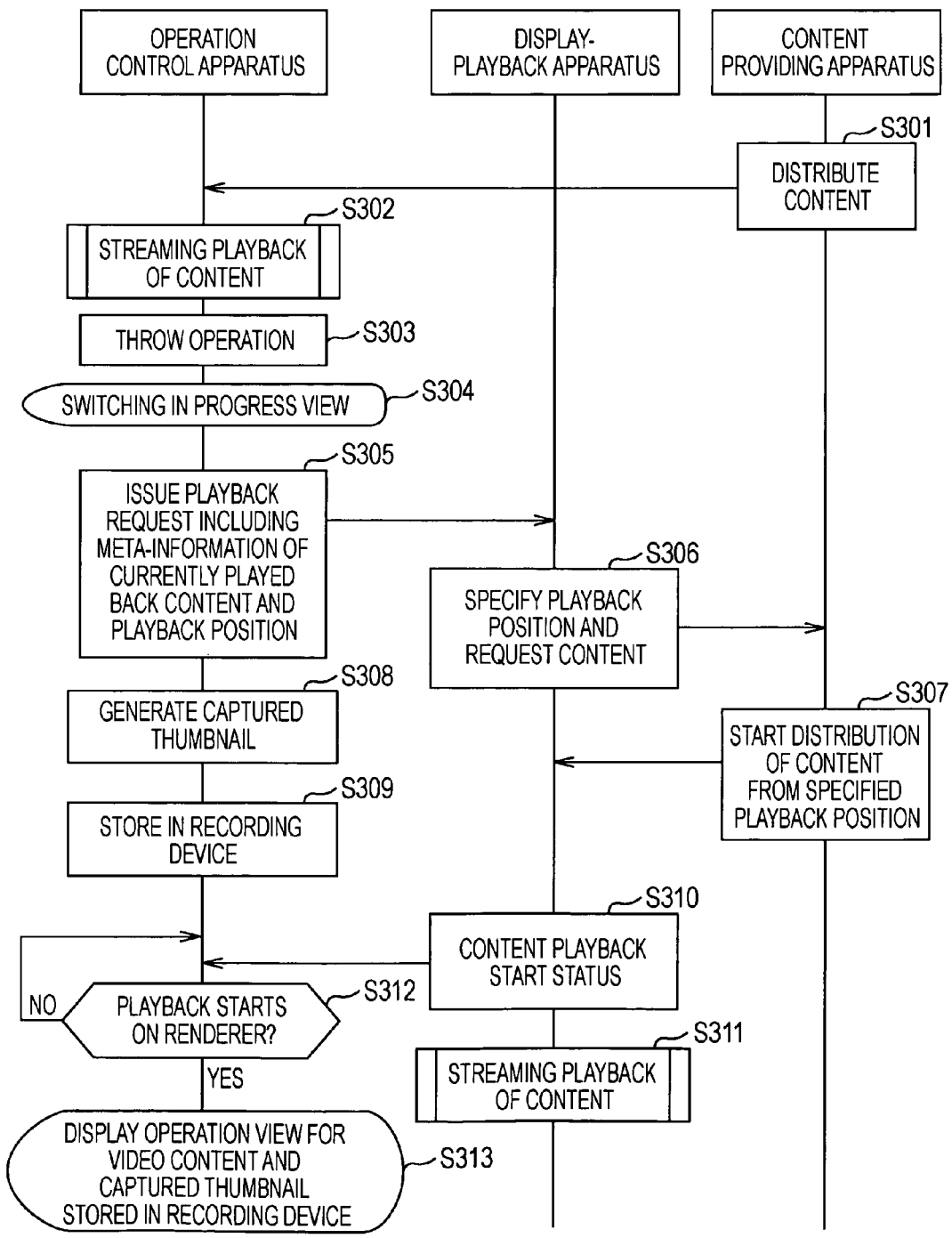
FIG. 19 is a state-transition diagram showing a first example process in the content display-playback system when a throw operation is performed.
Figure 20:
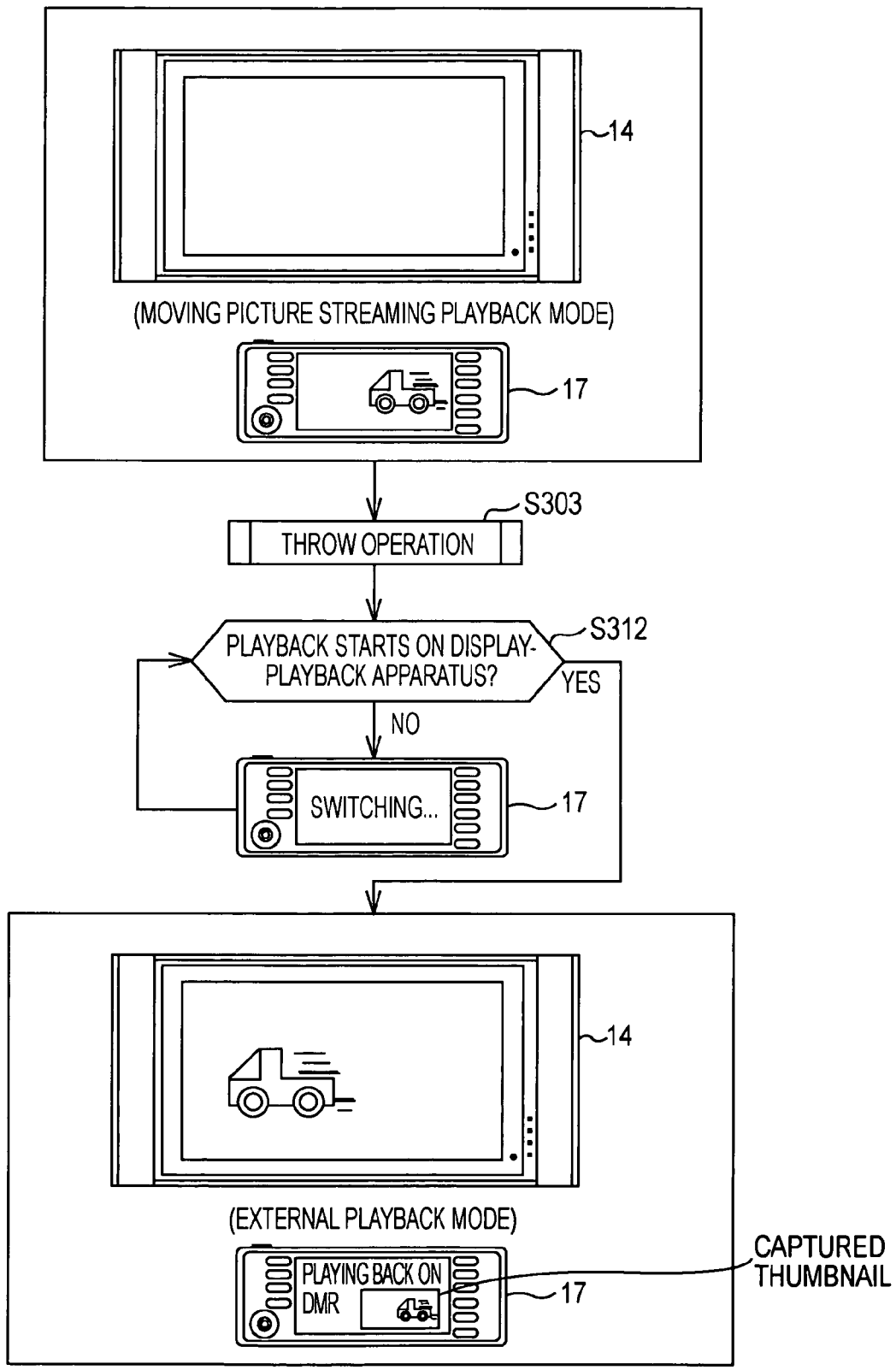
FIG. 20 is an image view showing the operation of the content display-playback system when a throw operation is performed.

FIG. 19 is a status-transition diagram of the first example process. FIG. 20 is an image view showing the operation. Referring to FIG. 19, in step S301, content is distributed from the content providing apparatus 12 to the operation control apparatus 17, and the operation begins during, as illustrated in FIG. 20, streaming playback of the content on the operation control apparatus 17 (step S302).

When the user operates the operation control apparatus 17 to perform a throw operation (step S303), then, in step S304, the operation control apparatus 17 displays a message indicating the switching in progress on the LCD 63 (see FIG. 20) until it is determined in step S312 that the display-playback apparatus 12 starts playback, discussed below. Then, the operation control apparatus 17 issues a playback request including the meta-information of the played back content, the playback position (time) information, and the content-providing-apparatus designation information to the display-playback apparatus 14 (step S305).

The display-playback apparatus 14 reads and interprets the playback request and the attached information, namely, the content meta-information, the playback position information, and the content-providing-apparatus designation information. The display-playback apparatus 14 specifies a playback position, and issues a request for the corresponding content to the content providing apparatus 12 designated by the content-providing-apparatus designation information (step S306).

In response to the request for the content from the display-playback apparatus 14, the content providing apparatus 12 distributes the specified content to the display-playback apparatus 14 from the specified playback position (step S307). Upon receiving the distributed content, the display-playback apparatus 14 sends to the operation control apparatus 17 a playback start status of the content indicating that the playback begins from the position from which the content has been distributed (step S310), and the content is played back by streaming (step S311).

The operation control apparatus 17, after issuing the playback request to the display-playback apparatus 14 in step S305, generates a captured thumbnail of the content that has been played back on the operation control apparatus 17 (step S308), and stores the captured thumbnail in the recording device (storage device 69) (step S309).

Upon receiving the playback start status from the display-playback apparatus 14 (YES in step S312), the operation control apparatus 17 displays an operation view for video content and the captured thumbnail image stored in the storage device 69, as illustrated in FIG. 20 (step S313).

By performing the first example process, in the content display-playback system 2 or 10, the operation control apparatus 17 stores a captured thumbnail image of the image being played back when the throw operation is performed, and displays at hand the captured thumbnail of the switched image in a corner of the display unit (LCD) 63 so that the user can easily understand the continued part of the content.

The operation control apparatus 17 may display a friendly name for identifying the display-playback apparatus 14 designated as a destination to which the display of the content is switched by the throw operation on the LCD 63. Thus, it is easier for the user to identify the display-playback apparatus 14 designated as the throw destination.

The operation control apparatus 17 may be provided with an internal database of network-connected devices using unique device names (UDNs) as key, in which custom names set by the user are registered, and the registered custom names may be displayed instead of the friendly names. The operation control apparatus 17 may store a thumbnail in the RAM 73 instead of the storage device 69.

Figure 21:
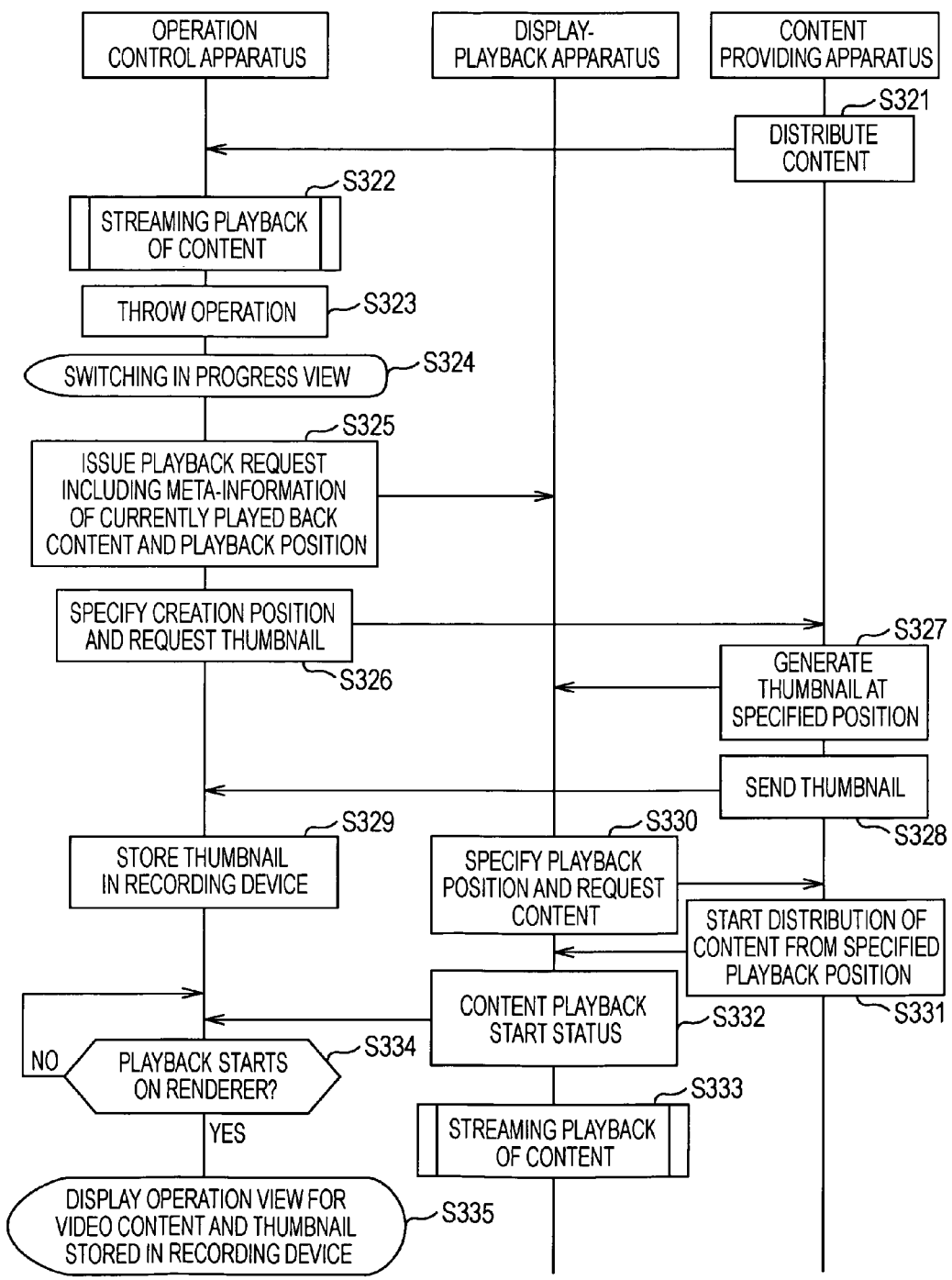
FIG. 21 is a state-transition diagram showing a second example process in the content display-playback system when a throw operation is performed.

A second example process in which the content providing apparatus 12 creates a captured thumbnail of the image being played back when the throw operation is performed will be described with reference to FIGS. 20 and 21. FIG. 21 is a state-transition diagram showing the second example process.

Referring to FIG. 21, in step S321, content is distributed from the content providing apparatus 12 to the operation control apparatus 17, and the operation begins during, as illustrated in FIG. 20, streaming playback of the content on the operation control apparatus 17 (step S322).

When the user operates the operation control apparatus 17 to perform a throw operation (step S323), then, in step S324, the operation control apparatus 17 displays a message indicating the switching in progress on the LCD 63 (see FIG. 20) until it is determined in step S334 that the display-playback apparatus 12 starts playback, discussed below. Then, the operation control apparatus 17 issues a playback request including the meta-information of the played back content, the playback position (time) information, and the content-providing-apparatus designation information to the display-playback apparatus 14 (step S325).

The operation control apparatus 17 specifies time information at which playback is to be switched, and requests the content providing apparatus 12 to create a thumbnail of the image associated with the specified time (step S326). In response to the request, the content providing apparatus 12 creates the thumbnail of the image at the specified position (step S327), and sends the created thumbnail to the operation control apparatus 17 (step S328). The operation control apparatus 17 stores the thumbnail sent from the content providing apparatus 12 in the storage device (recording device) 69.

The display-playback apparatus 14 receives the playback request and the attached information, such as the meta-information of the played back content and the playback position, from the operation control apparatus 17 in step S325. In step S330, the display-playback apparatus 14 specifies a playback position and issues a content request to the content providing apparatus 12. In response to the content request, the content providing apparatus 12 distributes the content to the display-playback apparatus 12 from the specified playback position (step S331). Upon receiving the distributed content, the display-playback apparatus 14 sends to the operation control apparatus 17 a playback start status of the content indicating that the playback begins from the position from which the content has been distributed (step S332), and the content is played back by streaming (step S333).

Upon receiving the playback start status from the display-playback apparatus 14 (YES in step S334), the operation control apparatus 17 displays an operation view for video content and the captured thumbnail image stored in the storage device 69, as illustrated in FIG. 20 (step S335).

By performing the second example process, in the content display-playback system 2 or 10, the operation control apparatus 17 stores a captured thumbnail image created by the content providing apparatus 12 when the throw operation is performed in the storage device 69, and displays at hand the captured thumbnail of the switched image in a corner of the display unit (LCD) 63 so that the user can easily understand the continued part of the content.

The operation control apparatus 17 may display a friendly name for identifying the display-playback apparatus 14 designated as a destination to which the display of the content is switched by the throw operation on the LCD 63. Thus, it is easier for the user to identify the display-playback apparatus 14 designated as the throw destination.

The operation control apparatus 17 may be provided with an internal database of network-connected devices using UDNs as key, in which custom names set by the user are registered, and the registered custom names may be displayed instead of the friendly names. The operation control apparatus 17 may store a thumbnail in the RAM 73 instead of the storage device 69.

It should be understood by those skilled in the art that various modifications, combinations, sub-combinations and alterations may occur depending on design requirements and other factors insofar as they are within the scope of the appended claims or the equivalents thereof.

What is claimed is:

1. A content display-playback system, comprising:
at least one content providing apparatus, the content providing apparatus being a content server;
a display-playback apparatus, the display-playback apparatus being a television that includes a display screen; and
an operation control apparatus, the operation control apparatus being a remote controller,
the content providing apparatus, the display-playback apparatus, and the operation control apparatus being connected to a network,
the operation control apparatus controlling operations of the content providing apparatus and the display-playback apparatus so that content can be transmitted and received among the content providing apparatus, the display-playback apparatus, and the operation control apparatus, and so that the content can be displayed and played back on the display screen of the display-playback apparatus and on the operation control apparatus,
wherein the operation control apparatus includes:
processing circuitry
that receives playback position information and content meta-information associated with content received from the content providing apparatus currently being played on the operation control apparatus, responsive to the operation control apparatus receiving a command to stop playback of the content at a playback stop time, the content meta-information including identifying image data for the content,
that retrieves the playback position information and the content meta-information, which includes the identifying image data for the content, responsive to the operation control apparatus receiving a command to resume playback of the content, and
that causes display of the identifying image data for the content responsive to retrieval of the playback position information and the content meta-information.

2. The content display-playback system according to claim 1, wherein the operation control apparatus includes storage circuitry, and the operation control apparatus stores in the storage circuitry the identifying image data, the identifying image data being a thumbnail image created from a content image associated with the content being played back when the playback is stopped.

3. The content display-playback system according to claim 1, wherein the operation control apparatus includes storage circuitry, and the operation control apparatus stores in the storage circuitry the identifying image data, the identifying image data being a thumbnail image created by the content providing apparatus when the playback is stopped.

4. The content display-playback system according to claim 1,
wherein the operation control apparatus further includes:
input operation reception circuitry that receives an operation input;
content-transmission-and-reception-signal generation circuitry that generates an operation control signal for transmitting and receiving the content among the content providing apparatus, the display-playback apparatus, and the operation control apparatus according to the operation input received by the input operation reception circuitry;

content storage circuitry that stores content received from the content providing apparatus according to a first operation control signal generated by the content-transmission-and-reception-signal generation circuitry; and display-playback circuitry that displays and plays back the content received from the content providing apparatus according to the first operation control signal generated by the content-transmission-and-reception-signal generation circuitry or that displays and plays back content received from a content providing apparatus designated on the basis of content-related information received from the display-playback apparatus according to a second operation control signal generated by the content-transmission-and-reception-signal generation circuitry, and wherein the operation control apparatus displays and plays back the content received from the content providing apparatus according to the first operation control signal by using the display-playback circuitry, and stores the content in the content storage circuitry.

5. The content display-playback system according to claim 1, wherein the operation control apparatus plays back the content from the playback stop position set according to the content meta-information and the playback position information when the operation control apparatus is disconnected from the network.

6. A content display-playback method for allowing an operation control apparatus to control operations of a content providing apparatus and a display-playback apparatus connected to a network so that content can be transmitted and received among the content providing apparatus, the display-playback apparatus, and the operation control apparatus and so that the content can be displayed and played back on the display-playback apparatus and the operation control apparatus, the content display-playback method comprising:

receiving, at the operation control apparatus, playback position information and content meta-information associated with content received from the content providing apparatus currently being played on the operation control apparatus, responsive to the operation control apparatus receiving a command to stop playback of the content at a playback stop time, the content meta-information including identifying image data for the content;

retrieving, at the operation control apparatus, the playback position information and the content meta-information, which includes the identifying image data for the content, responsive to the operation control apparatus receiving a command to resume playback of the content; and causing, using the operation control apparatus, display of the identifying image data for the content responsive to retrieval of the playback position information and the content meta-information, wherein the content providing apparatus is a content server, wherein the display-playback apparatus is a television that includes a display screen, and wherein the operation control apparatus is a remote controller.

7. A non-transitory recording medium having a content display-playback program recorded thereon, the content display-playback program implementing a content display-playback method for allowing an operation control apparatus to control operations of a content providing apparatus and display-playback apparatus connected to a network so that content can be transmitted and received among the content providing apparatus, the display-playback apparatus, and the operation control apparatus and so that the content can be displayed and played back on the display-playback apparatus and the operation control apparatus, the content display-playback method comprising:

receiving, at the operation control apparatus, playback position information and content meta-information associated with content received from the content providing apparatus currently being played on the operation control apparatus, responsive to the operation control apparatus receiving a command to stop playback of the content at a playback stop time the content meta-information including identifying image data for the content;

retrieving, at the operation control apparatus, the playback position information and the content meta-information, which includes the identifying image data for the content, responsive to the operation control apparatus receiving a command to resume playback of the content; and causing, using the operation control apparatus, display of the identifying image data for the content responsive to retrieval of the playback position information and the content meta-information, wherein the content providing apparatus is a content server, wherein the display-playback apparatus is a television that includes a display screen, and wherein the operation control apparatus is a remote controller.

8. An operation control apparatus that controls operations of a content providing apparatus and display-playback apparatus connected to a network so that content can be transmitted and received among the content providing apparatus, the display-playback apparatus, and the operation control apparatus and so that the content can be displayed and played back on the display-playback apparatus and the operation control apparatus, the operation control apparatus comprising:

processing circuitry that receives playback position information and content meta-information associated with content received from the content providing apparatus currently being played on the operation control apparatus, responsive to the operation control apparatus receiving a command to stop playback of the content at a playback stop time, the content meta-information including identifying image data for the content, that retrieves the playback position information and the content meta-information, which includes the identifying image data for the content, responsive to the operation control apparatus receiving a command to resume playback of the content, and that causes display of the identifying image data for the content responsive to retrieval of the playback position information and the content meta-information, wherein the content providing apparatus is a content server, wherein the display-playback apparatus is a television that includes a display screen, and wherein the operation control apparatus is a remote controller.

9. A content display-playback system, comprising:

a content providing apparatus connected to a network, the content providing apparatus being a content server;

at least one display-playback apparatus connected to the network, the display-playback apparatus being a television that includes a display screen; and an operation control apparatus that controls operations of the content providing apparatus and the display-playback apparatus so that content can be transmitted and received among the content providing apparatus, the display-playback apparatus, and the operation control apparatus, and so that the content can be displayed and played back on the display screen of the display-playback apparatus and on the operation control apparatus, the operation control apparatus being a remote controller, wherein, the operation control apparatus includes a content display portion, when the operation control apparatus performs a throw operation during a playback of content received from the content providing apparatus, the operation control apparatus:

generates a playback request including content meta-information concerning the played back content and playback position information of the content being played back, when the throw operation is performed, based on retrieval of the playback position information and the content meta-information, which are stored in the operation control apparatus, transmits the playback request to a display-playback apparatus designated as a throw destination, generates a thumbnail image from a content image being played back when the throw operation is performed, and displays on the content display portion of the operation control apparatus, upon a reception of a playback start signal from the display-playback apparatus, the thumbnail image.

10. A content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the content display-playback method comprising:

when the operation control apparatus performs a throw operation during a playback of content received from the content providing apparatus, obtaining content meta-information concerning the played back content and playback position information of the content being played back when the throw operation is performed;

attaching the content meta-information and the playback position information to a playback request based on retrieval of the playback position information and the content meta-information, which are stored in the operation control apparatus;

transmitting the playback request to a display-playback apparatus designated as a throw destination;

generating a thumbnail image from a content image being played back when the throw operation is performed; and displaying on a content display portion of the operation control apparatus, upon a reception of a playback start signal from the display-playback apparatus, the thumbnail image, wherein the content providing apparatus is a content server, wherein the display-playback apparatus is a television that includes a display screen, and wherein the operation control apparatus is a remote controller.

11. A non-transitory recording medium having a content display-playback program recorded thereon, the content display-playback program implementing a content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the content display-playback method comprising:

when the operation control apparatus performs a throw operation during a playback of content received from the content providing apparatus, obtaining content meta-information concerning the played back content and playback position information of the content being played back when the throw operation is performed;

attaching the content meta-information and the playback position information to a playback request based on retrieval of the playback position information and the content meta-information, which are stored in the operation control apparatus;

transmitting the playback request to a display-playback apparatus designated as a throw destination;

generating a thumbnail image from a content image being played back when the throw operation is performed; and displaying on a content display portion of the operation control apparatus, upon a reception of a playback start signal from the display-playback apparatus, the thumbnail image, wherein the content providing apparatus is a content server, wherein the display-playback apparatus is a television that includes a display screen, and wherein the operation control apparatus is a remote controller.

12. An operation control apparatus that controls operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the operation control apparatus comprising:

processing circuitry that attaches to a playback request, when the operation control apparatus performs a throw operation during a playback of content received from the content providing apparatus, content meta-information concerning the played back content and playback position information of the content being played back, when the throw operation is performed, based on retrieval of the playback position information and the content meta-information, which are stored in the operation control apparatus, and to generate a thumbnail image from a content image being played back when the throw operation is performed;

communication circuitry that transmits the playback request to a display-playback apparatus designated as a throw destination; and display circuitry that displays, upon a reception of a playback start signal from the display-playback apparatus, the thumbnail image, wherein the content providing apparatus is a content server, wherein the display-playback apparatus is a television that includes a display screen, and wherein the operation control apparatus is a remote controller.

13. A content display-playback system, comprising:
- a content providing apparatus connected to a network, the content providing apparatus being a content server;
- at least one display-playback apparatus connected to the network, the display-playback apparatus being a television that includes a display screen; and
- an operation control apparatus that controls operations of the content providing apparatus and the display-playback apparatus so that content can be transmitted and received among the content providing apparatus, the display-playback apparatus, and the operation control apparatus, and so that the content can be displayed and played back on the display screen of the display-playback apparatus and on the operation control apparatus, the operation control apparatus being a remote controller,
- wherein, when the operation control apparatus performs a throw operation during a playback of content received from the content providing apparatus, the operation control apparatus generates a playback request including content meta-information concerning the played back content and playback position information of the content being played back, when the throw operation is performed, based on retrieval of the playback position information and the content meta-information, which are stored in the operation control apparatus, and transmits the playback request to a display-playback apparatus designated as a throw destination, and
- wherein the operation control apparatus receives a thumbnail image after a transmission of the playback position information, and displays on a content display portion thereof, upon a reception of a playback start signal from the display-playback apparatus, the thumbnail image.

14. A content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the content display-playback method comprising:
- when the operation control apparatus performs a throw operation during a playback of content received from the content providing apparatus, obtaining content meta-information concerning the played back content and playback position information of the content being played back, when the throw operation is performed, based on retrieval of the playback position information and the content meta-information, which are stored in the operation control apparatus;
- attaching the content meta-information and the playback position information to a playback request;
- transmitting the playback request to a display-playback apparatus designated as a throw destination;
- receiving a thumbnail image after a transmission of the playback position information; and
- displaying on a content display portion of the operation control apparatus, upon a reception of a playback start signal from the display-playback apparatus, the thumbnail image,
- wherein the content providing apparatus is a content server,
- wherein the display-playback apparatus is a television that includes a display screen, and
- wherein the operation control apparatus is a remote controller.

15. A non-transitory recording medium having a content display-playback program recorded thereon, the content display-playback program implementing a content display-playback method for allowing an operation control apparatus to control operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the content display-playback method comprising:
- when the operation control apparatus performs a throw operation during a playback of content received from the content providing apparatus, obtaining content meta-information concerning the played back content and playback position information of the content being played back, when the throw operation is performed, based on retrieval of the playback position information and the content meta-information, which are stored in the operation control apparatus;
- attaching the content meta-information and the playback position information to a playback request;
- transmitting the playback request to a display-playback apparatus designated as a throw destination;
- receiving a thumbnail image after a transmission of the playback position information; and
- displaying on a content display portion of the operation control apparatus, upon a reception of a playback start signal from the display-playback apparatus, the thumbnail image,
- wherein the content providing apparatus is a content server,
- wherein the display-playback apparatus is a television that includes a display screen, and
- wherein the operation control apparatus is a remote controller.

16. An operation control apparatus that controls operations of a content providing apparatus and at least one display-playback apparatus that are connected to a network so that content can be transmitted and received among the content providing apparatus, the display-playback apparatus, and the operation control apparatus and so that the content can be displayed and played back on the display-playback apparatus and the operation control apparatus, the operation control apparatus comprising:
- processing circuitry that attaches to a playback request, when the operation control apparatus performs a throw operation during a playback of content received from the content providing apparatus, content meta-information concerning the played back content and playback position information of the content being played back, when the throw operation is performed, based on retrieval of the playback position information and the content meta-information, which are stored in the operation control apparatus;
- communication circuitry that transmits the playback request to a display-playback apparatus designated as a throw destination, and that receives a thumbnail image after a transmission of the playback position information; and
- display circuitry that displays, upon a reception of a playback start signal from the display-playback apparatus, the thumbnail image,
- wherein the content providing apparatus is a content server,
- wherein the display-playback apparatus is a television that includes a display screen, and
- wherein the operation control apparatus is a remote controller.

* * * * *